(12) United States Patent
Kurono

(10) Patent No.: US 10,408,920 B2
(45) Date of Patent: Sep. 10, 2019

(54) RADAR DEVICE, SIGNAL PROCESSING DEVICE AND SIGNAL PROCESSING METHOD FOR RADAR DEVICE

(71) Applicant: FUJITSU TEN LIMITED, Kobe-shi, Hyogo (JP)

(72) Inventor: Yasuhiro Kurono, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 251 days.

(21) Appl. No.: 15/271,783

(22) Filed: Sep. 21, 2016

(65) Prior Publication Data

US 2017/0131385 A1    May 11, 2017

(30) Foreign Application Priority Data

Nov. 6, 2015 (JP) .................... 2015-218222

(51) Int. Cl.

| | |
|---|---|
| *G01S 7/35* | (2006.01) |
| *G01S 13/42* | (2006.01) |
| *G01S 13/34* | (2006.01) |
| *G01S 13/58* | (2006.01) |
| *G01S 13/00* | (2006.01) |

(52) U.S. Cl.
CPC ............ *G01S 7/352* (2013.01); *G01S 13/343* (2013.01); *G01S 13/42* (2013.01); *G01S 13/584* (2013.01)

(58) Field of Classification Search
CPC ........ G01S 7/352; G01S 13/42; G01S 13/343; G01S 13/584; G01S 15/584; G01S 15/8986; G01S 13/227; G01S 13/24; G01S 7/354; G01S 13/345

See application file for complete search history.

(56) References Cited

U.S. PATENT DOCUMENTS 5,027,122 A * 6/1991 Wieler .................. G01S 13/227
                                                       342/26 D
5,325,097 A * 6/1994 Zhang et al. ......... G01S 13/345
                                                       342/71

(Continued)

FOREIGN PATENT DOCUMENTS

| JP | 2007-322331 A | 12/2007 |
|---|---|---|
| JP | 2009-510410 A | 3/2009 |

(Continued)

*Primary Examiner* — Bernarr E Gregory
(74) *Attorney, Agent, or Firm* — Oliff PLC

(57) ABSTRACT

There is provided a radar device. A transmitting unit transmits a transmission signal in which an up period and a down period are repeated. A receiving unit receives reception signals from a target. A distance measuring unit computes the distance between the target and the radar device based on a reception signal corresponding to the up period, as an up-side distance, and computes the distance between the target and the radar device based on a reception signal corresponding to the down period, as a down-side distance. An aliasing determining unit determines whether velocity aliasing has occurred, based on the up-side distance and the down-side distance. A velocity measuring unit computes the relative velocity between the target and the radar device, based on the result of determination on velocity aliasing, and one of the reception signal of the up period and the reception signal of the down period.

5 Claims, 17 Drawing Sheets

(56) References Cited

U.S. PATENT DOCUMENTS

| | | | | |
|---|---|---|---|---|
| 5,619,208 A | * | 4/1997 | Tamatsu | G01S 13/345 |
| | | | | 342/115 |
| 6,011,507 A | * | 1/2000 | Curran | G01S 7/354 |
| | | | | 342/70 |
| 6,492,938 B1 | * | 12/2002 | Alland | G01S 7/354 |
| | | | | 342/118 |
| 9,835,723 B2 | * | 12/2017 | Jansen et al. | G01S 13/227 |
| 2004/0150552 A1 | * | 8/2004 | Barbella | G01S 13/24 |
| | | | | 342/109 |
| 2008/0191928 A1 | | 8/2008 | Haberland et al. | |
| 2011/0074620 A1 | | 3/2011 | Wintermantel | |
| 2011/0074621 A1 | | 3/2011 | Wintermantel | |
| 2011/0080313 A1 | | 4/2011 | Wintermantel et al. | |
| 2011/0080314 A1 | | 4/2011 | Wintermantel | |

FOREIGN PATENT DOCUMENTS

| | | |
|---|---|---|
| JP | 2011-526370 A | 10/2011 |
| JP | 2014-106120 A | 6/2014 |
| JP | 2016-003873 A | 1/2016 |

\* cited by examiner

FIG. 1
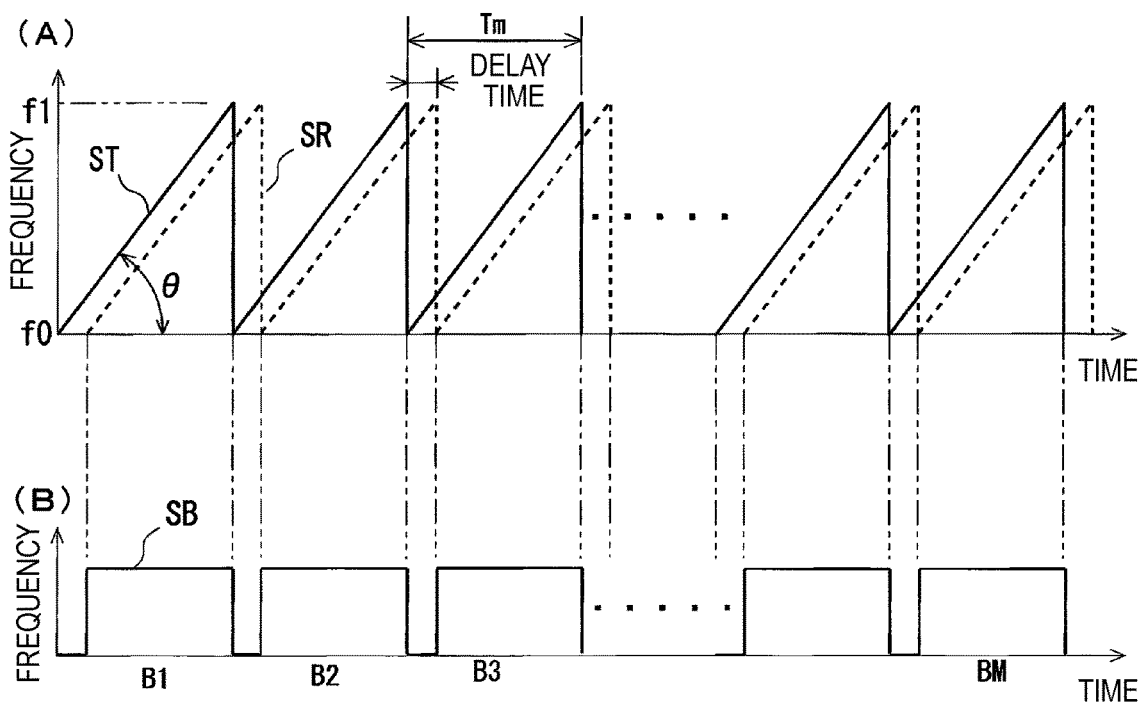
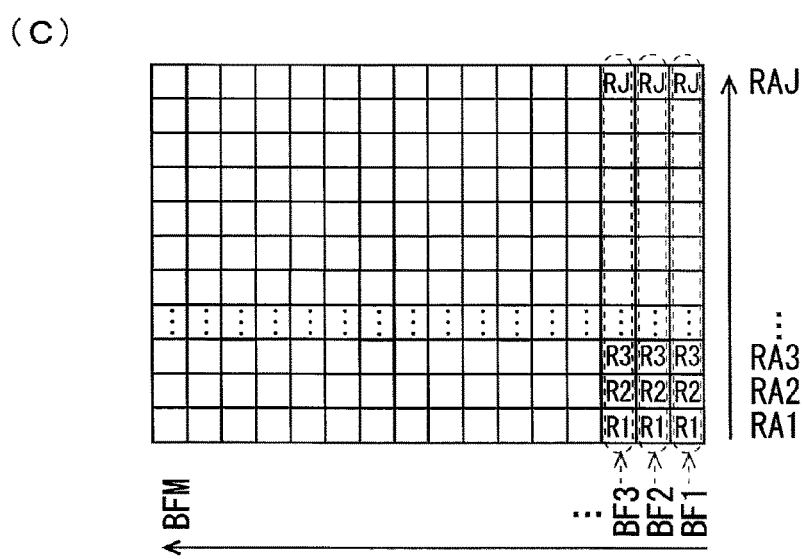

FIG. 10
(A)
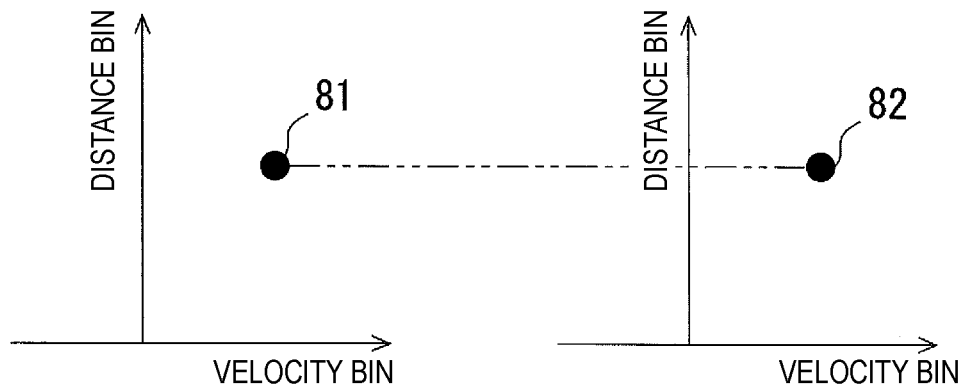
(B)
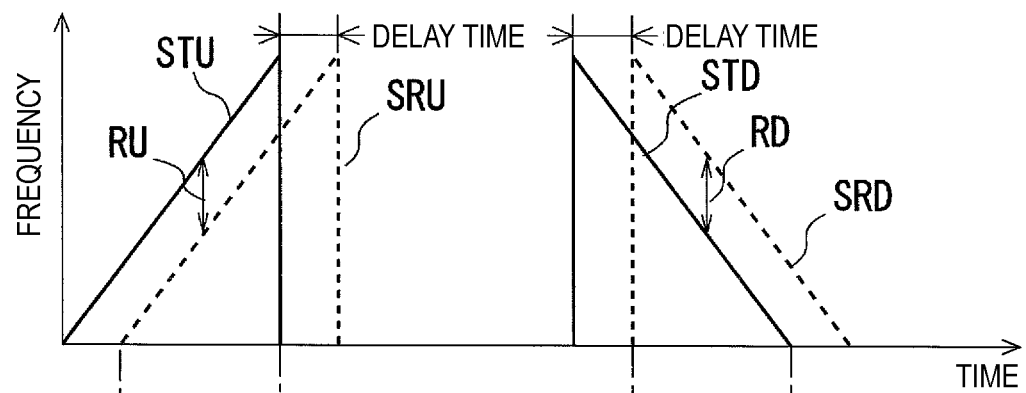
(C)
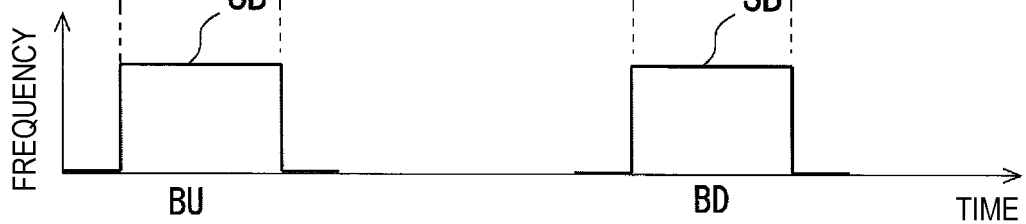

FIG. 11
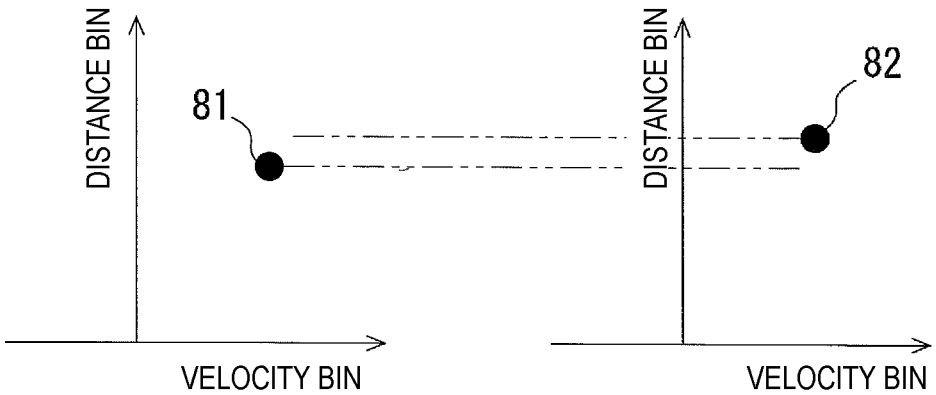
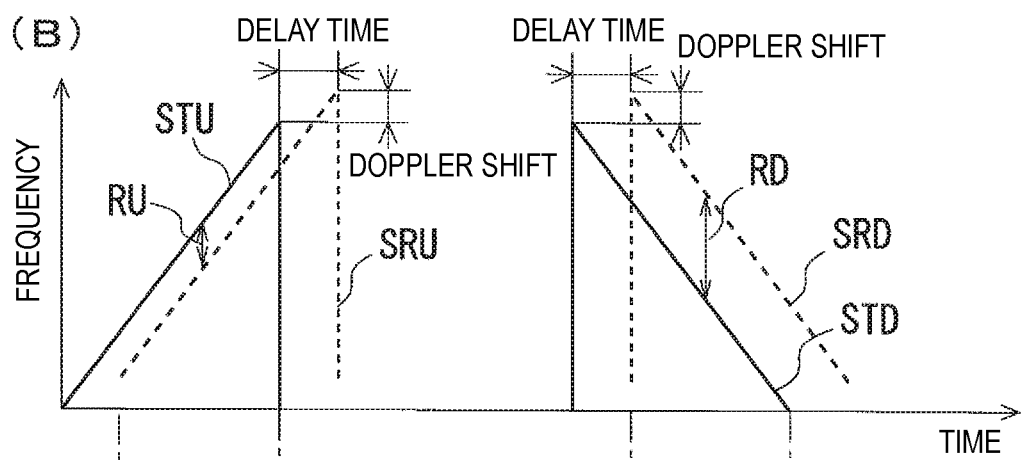
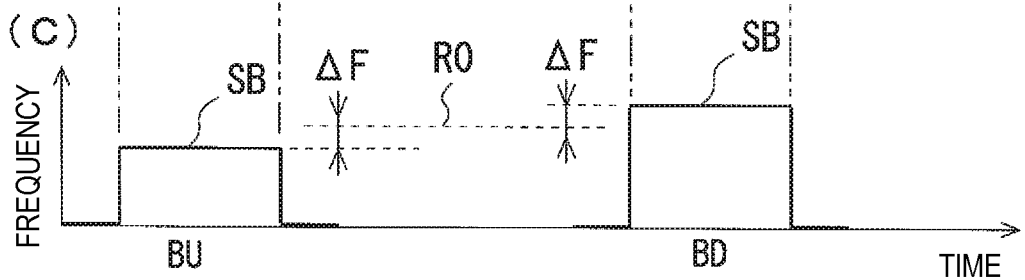

FIG. 15A

| NUMBER OF TIMES OF ALIASING | RELATIVE VELOCITY | UPbin - DNbin |
|---|---|---|
| POSITIVE SECOND | 220.16 [m/s] | 2.88 [bin] |
| POSITIVE FIRST | 110.08 [m/s] | 1.44 [bin] |
| ZEROTH | 0.00 [m/s] | 0.00 [bin] |
| NEGATIVE FIRST | -110.08 [m/s] | -1.44 [bin] |
| NEGATIVE SECOND | -220.16 [m/s] | -2.88 [bin] |

FIG. 15B

| NUMBER OF TIMES OF ALIASING | RELATIVE VELOCITY | Upbin-DNbin |
|---|---|---|
| POSITIVE SECOND | 273.63 [m/s] | 3.58 [bin] |
| POSITIVE FIRST | 163.55 [m/s] | 2.14 [bin] |
| ZEROTH | 53.47 [m/s] | 0.7 [bin] |
| NEGATIVE FIRST | -56.61 [m/s] | -0.74 [bin] |
| NEGATIVE SECOND | -166.69 [m/s] | -2.18 [bin] |

FIG. 16

REFERENCE VALUE TABLE

| | REFERENCE VALUE FOR DISTANCE BIN DIFFERENCE | | | | |
|---|---|---|---|---|---|
| | NUMBER OF TIMES OF ALIASING | | | | |
| COMPUTED RELATIVE VELOCITY | −2 | −1 | 0 | 1 | 2 |
| ⋮ | ⋮ | ⋮ | ⋮ | ⋮ | ⋮ |
| 53.47 | −2.18 | −0.74 | 0.7 | 2.14 | 3.58 |
| ⋮ | ⋮ | ⋮ | ⋮ | ⋮ | ⋮ |
| 0 | −2.88 | −1.44 | 0 | 1.44 | 2.88 |
| ⋮ | ⋮ | ⋮ | ⋮ | ⋮ | ⋮ |
| −53.47 | −3.58 | −2.14 | −0.7 | 2.14 | 3.58 |
| ⋮ | ⋮ | ⋮ | ⋮ | ⋮ | ⋮ |

FIG. 17

RANGE TABLE

| | | DISTANCE BIN DIFFERENCE RANGE | | | | |
|---|---|---|---|---|---|---|
| | | -2 | -1 | 0 | 1 | 2 |
| | NUMBER OF TIMES OF ALIASING | | | | | |
| COMPUTED RELATIVE VELOCITY | ... | ... | ... | ... | ... | ... |
| | 53.47 | EQUAL TO OR GREATER THAN -2.90 LESS THAN -1.46 | EQUAL TO OR GREATER THAN -1.46 LESS THAN -0.02 | EQUAL TO OR GREATER THAN -0.02 LESS THAN 1.42 | EQUAL TO OR GREATER THAN 1.42 LESS THAN 2.86 | EQUAL TO OR GREATER THAN 2.86 LESS THAN 4.30 |
| | ... | ... | ... | ... | ... | ... |
| | 0 | EQUAL TO OR GREATER THAN -3.60 LESS THAN -2.16 | EQUAL TO OR GREATER THAN -2.16 LESS THAN -0.72 | EQUAL TO OR GREATER THAN -0.72 LESS THAN 0.72 | EQUAL TO OR GREATER THAN 0.72 LESS THAN 2.16 | EQUAL TO OR GREATER THAN 2.16 LESS THAN 3.60 |
| | ... | ... | ... | ... | ... | ... |
| | -53.47 | EQUAL TO OR GREATER THAN -2.90 LESS THAN -2.86 | EQUAL TO OR GREATER THAN -2.86 LESS THAN -1.42 | EQUAL TO OR GREATER THAN -1.42 LESS THAN 0.02 | EQUAL TO OR GREATER THAN 0.02 LESS THAN 1.46 | EQUAL TO OR GREATER THAN 1.46 LESS THAN 2.90 |
| | ... | ... | ... | ... | ... | ... |

RADAR DEVICE, SIGNAL PROCESSING DEVICE AND SIGNAL PROCESSING METHOD FOR RADAR DEVICE

TECHNICAL FIELD

The present invention relates to a technology related to a radar device, a signal processing device, and a signal processing method for performing target detection.

RELATED ART

Recently, as radar devices for detecting targets, FCM (fast chirp modulation) type radar devices have been proposed. An FCM system is a system for obtaining the distance between a target and a radar device on the basis of the frequencies of beat signals generated from a transmission signal and reception signals which are the reflected waves of the transmission signal from the target, and obtaining the relative velocity between the target and the radar device on the basis of phase change of the beat signals, and can separately obtain the distance and the relative velocity. Therefore, it is possible to expect more accurate target detection. Also, the FCM system has the advantage that, even in a case where targets having different relative velocities exist at the same distance, it is possible to discriminate the individual targets on the basis of their relative velocities, and it is possible to suppress angle errors from increasing due to the influence of the surroundings.

In Patent Document 1, an FCM type radar system is configured to radiate a transmission signal by one or more transmitting antennae, and receive the reflected waves of the transmission signal from targets, by one or more receiving antennae. This system acquires reception signals by different combinations of the transmitting antennae and the receiving antennae, and obtains the bearings of the targets on the basis of the reception signals.

A radar device of Patent Document 2 is configured to perform a detecting process on targets existing in at least one first partial area around a vehicle, in a first time section, and determine only the distances of targets existing in each of at least one second partial area around the vehicle, without determining the velocities of the targets of the corresponding area, in a second time section.

In Patent Document 3, an FM-CW type radar device is configured to obtain the distances and relative velocities of targets by paring up peaks and down peaks obtained by an FFT process.

A radar device of Patent Document 4 is configured to determine whether there is a point whether computed Doppler velocity discontinuously changes, and perform correction on aliasing at each point where the computed Doppler velocity discontinuously changes.

Patent Document 1: Japanese Patent Application Publication No. 2011-526370A
Patent Document 2: Japanese Patent Application Publication No. 2009-510410A
Patent Document 3: Japanese Patent Application Publication No. 2014-106120A
Patent Document 4: Japanese Patent Application Publication No. 2007-322331A Here, a method of computing distance and relative velocity in the FCM system will be described in brief.

When the waveform of one period of a transmission wave in which the frequency varies like a saw-tooth wave is defined as one chirp, the FCM system transmits a plurality of chirps with a period shorter than that in the FMCW system, and receives reflected waves from a target, as reception signals, and obtains the differences between each of the reception signals and the transmission wave, thereby obtaining beat signals, and performs two-dimensional FFT (Fast Fourier Transform) on the beat signals, thereby obtaining the distance and relative velocity between the target and the radar device. Specifically, since the time delays of the reception signals relative to the transmission wave increase as the distance of the target increases, the frequencies of the beat signals are proportional to the distance. Therefore, if an FFT process is performed on each beat signal, a peak appears at the position of a frequency corresponding to the distance of the target. Also, since FFT can extract a reception level and phase information at each of frequency points (hereinafter, also referred to as range bins) set at intervals of a predetermined frequency, accurately, a peak appears at a frequency range bin corresponding to the distance of the target. Therefore, it is possible to obtain the distance to the target by detecting the peak frequency.

Now, relative velocity computation will be described. In a case where there is a relative velocity between the vehicle and the target, the FCM system detects a Doppler frequency between the beat signals, using phase change attributable to the Doppler frequency, thereby computing the relative velocity. In other words, if the relative velocity is 0, since there is no Doppler component between the reception signals, all of the phases of the reception signals related to the individual chirps become same. Meanwhile, in a case where there is a relative velocity between the vehicle and the target, a phase change is caused by a Doppler frequency between the reception signals related to the individual chirps. Since peak information obtained by performing FFT on the beat signals includes such phase information, if the peak information of the same target obtained from the individual beat signals is arranged in time series, and the second FFT is performed, the Doppler frequency is obtained from the phase information, and a peak appears at the position of the obtained frequency. This peak frequency corresponds to the relative velocity. As described above, it is possible to compute the distance and the relative velocity by performing two-dimensional FFT on the beat signals.

As described above, the FCM system consecutively transmits the plurality of chirps, and consecutively receives the plurality of reception signals corresponding to the chirps, and obtains a Doppler frequency from phase change between the consecutive reception signals, thereby performing velocity measurement. Therefore, the detection velocity range is determined on the basis of the period of the reception signals, that is, the period of the chirps, and if the relative velocity of the target exceeds the detection velocity range, velocity aliasing occurs, and thus it is impossible to correctly perform velocity measurement. The reason is that, since Doppler frequencies are sampled at the period of the chirps, if one period of the Doppler frequencies becomes less than twice the period of the chirps, Doppler frequencies are not correctly sampled, and are detected as aliasing signals (aliasing).

Also, since the FCM system uses a transmission signal (chirps) with a shorter period as compared to an FMCW (Frequency Modulated Continuous Wave) system of the related art, hardware having a high sampling frequency is necessary, and it is impossible to widely set a detection range due to restrictions on hardware. For example, if the bandwidth of the transmission signal is set to be narrow, that is, $\Delta F$ is set to be low, without changing the sampling frequency, and the period of the transmission signal is set to be short, and a distance/relative-velocity detection range is set to be wide, an amount of data which can be acquired at the corresponding sampling frequency becomes relatively small, and distance/relative-velocity resolution significantly decreases. For this reason, even if it is desired to use hardware having a high sampling frequency, in terms of conditions such as size, weight, and cost, there is no hardware which is usable as a current in-vehicle radar and has specifications capable of implementing a detection velocity range and a resolution equivalent to those of the FM-CW system of the related art, and thus it is difficult in the FCM system to implement a detection velocity range and a resolution equivalent to those of the FM-CW system.

Therefore, there is a problem that it is impossible to widely set a detection velocity range and it is impossible to accurately perform velocity measurement due to occurrence of aliasing in relative velocity.

SUMMARY

It is therefore an object of the present invention to provide a technology related to a radar device capable of accurate relative velocity detection even in a case where aliasing in relative velocity has occurred.

According to a first aspect of the embodiments of the present invention, there is provided a radar device comprising: a transmitting unit configured to transmit a transmission signal in which an up period in which the frequency increases and a down period in which the frequency are repeated; a receiving unit configured to receive the reflected waves of the transmission signal from a target, as reception signals; a distance measuring unit configured to compute the distance between the target and the radar device based on a reception signal corresponding to the up period, as an up-side distance, and compute the distance between the target and the radar device based on a reception signal corresponding to the down period, as a down-side distance; an aliasing determining unit configured to determine whether velocity aliasing has occurred, on the basis of the up-side distance and the down-side distance; and a velocity measuring unit configured to compute the relative velocity between the target and the radar device, on the basis of the result of determination on velocity aliasing, and at least one of the reception signal corresponding to the up period and the reception signal corresponding to the down period.

According to a second aspect of the embodiments of the present invention, there is provided a signal processing device for a radar device, comprising: a distance measuring unit configured to receive the reflected waves of a transmission signal in which an up period in which the frequency increases and a down period in which the frequency are repeated, from a target, as reception signals, and compute the distance between the target and the radar device based on a reception signal corresponding to the up period, as an up-side distance, and compute the distance between the target and the radar device based on a reception signal corresponding to the down period, as a down-side distance; an aliasing determining unit configured to determine whether velocity aliasing has occurred, on the basis of the up-side distance and the down-side distance; and a velocity measuring unit configured to compute the relative velocity between the target and the radar device, on the basis of the result of determination on aliasing, and at least one of the reception signal corresponding to the up period and the reception signal corresponding to the down period.

According to a third aspect of the embodiments of the present invention, there is provided a signal processing method for a radar device, comprising: a step of receiving the reflected waves of a transmission signal in which an up period in which the frequency increases and a down period in which the frequency are repeated, from a target, as reception signals, and computing the distance between the target and the radar device based on a reception signal corresponding to the up period, as an up-side distance, and computing the distance between the target and the radar device based on a reception signal corresponding to the down period, as a down-side distance; a step of determining whether velocity aliasing has occurred, on the basis of the up-side distance and the down-side distance; and a step of computing the relative velocity between the target and the radar device, on the basis of the result of determination on aliasing, and at least one of the reception signal corresponding to the up period and the reception signal corresponding to the down period.

Also, the present invention may be a program for implementing the processes which are performed in the above described signal processing device. Further, the present invention may be a computer-readable recording medium retaining that program. In this case, it is possible to make a computer or the like read and execute the program of the recording medium, thereby providing the functions of the program. Here, the term "computer-readable recording medium" means a recording medium in which information such as data and programs can be accumulated electrically, magnetically, optically, mechanically, or chemically, and from which the information can be read by a computer or the like.

According to the present invention, it is possible to provide a technology related to a radar device capable of accurate relative velocity detection even in a case where aliasing in relative velocity has occurred.

BRIEF DESCRIPTION OF THE DRAWINGS

Exemplary embodiments of the present invention will be described in detailed based on the following figures, wherein:

FIG. 1 is an explanatory view of an FCM system;

FIG. 10 is an explanatory view of an up-side relative velocity and a down-side relative velocity in a case where the relative velocity of a target is 0;

FIG. 11 is an explanatory view of an up-side relative velocity and a down-side relative velocity in a case where the relative velocity of a target is positive;

FIG. 15A is a view illustrating the correspondence relation of values representing the number of times of aliasing, actual velocities, and reference values for bin differences, in a case where a relative velocity is 0 m/s;

FIG. 15B is a view illustrating the correspondence relation of values representing the number of times of aliasing, actual velocities, and reference values for bin differences in a case where a relative velocity is 53.47 m/s;

FIG. 16 is a view illustrating an example of a reference value table;

FIG. 17 is a view illustrating an example of a range table; and

DETAILED DESCRIPTION

Figure 2:
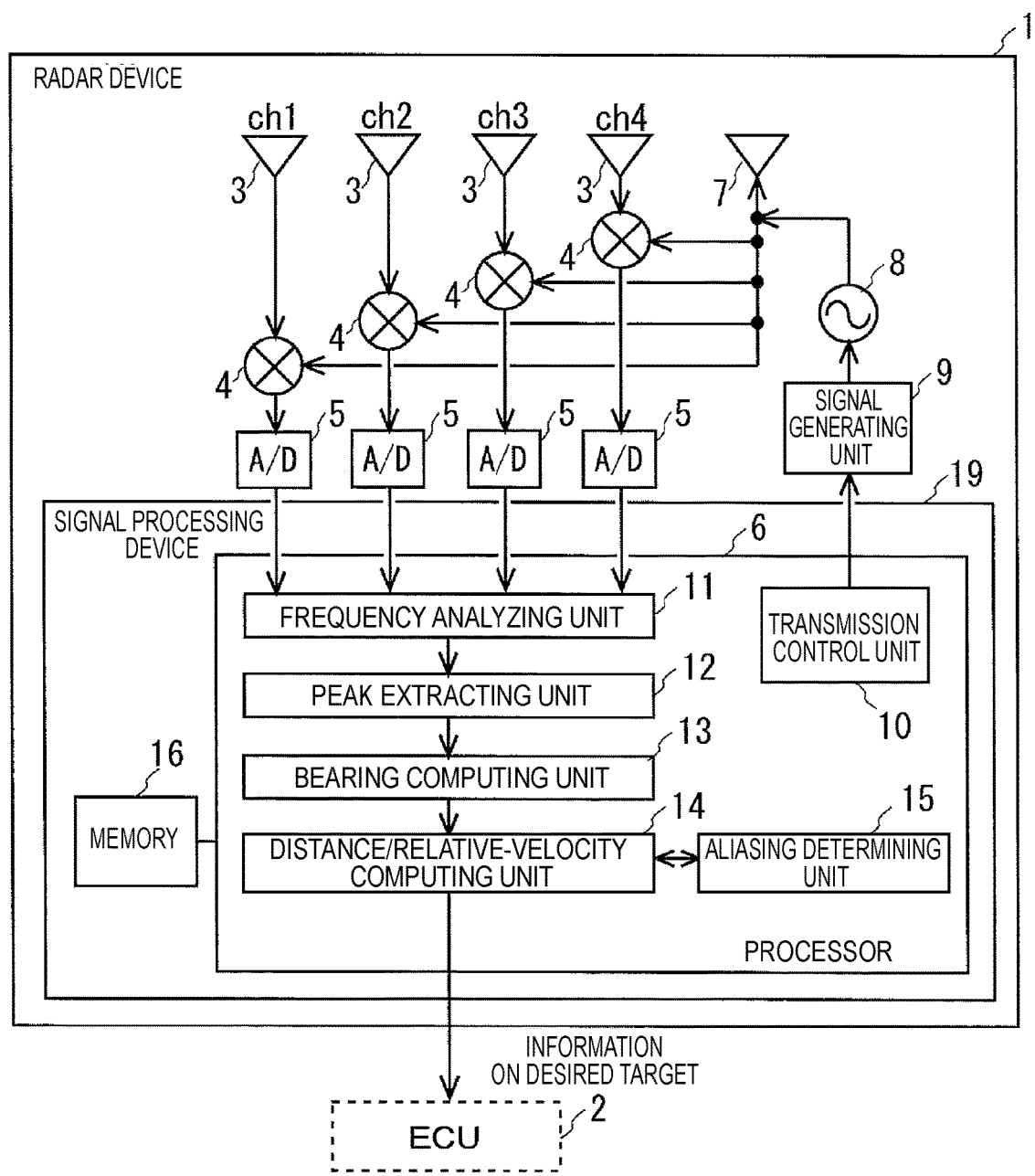
FIG. 2 is a configuration diagram of a radar device.

Hereinafter, embodiments of a radar device of the present invention will be described on the basis of the accompanying drawings. FIG. 1 is an explanatory view of an FCM system, and FIG. 2 is a configuration diagram of a radar device 1 according to the embodiments. The radar device 1 according to the embodiments can be mounted on a vehicle and be used to detect targets existing around the vehicle, such as other vehicles, signs, and guard rails. The result of target detection can be output to some components of the vehicle, such as a storage unit and an electrical control unit (ECU), and be used in, for example, a pre-crash safety system (PCS) or an AEB (Advanced Emergency Braking) system to control the vehicle. However, the radar device 1 according to the embodiments may be used for various uses (such as monitoring of flying aircrafts and sailing vessels) other than an in-vehicle radar device.

First Embodiment (Configuration of Device)

The radar device 1 includes a transmitting antenna 7, an oscillator 8, and a signal generating unit 9. Also, the radar device 1 includes receiving antennae 3 (ch1 to ch4) arranged at regular intervals, mixers 4 (ch1 to ch4) connected to the receiving antennae 3, respectively, A/D (Analog to Digital) converters 5 (ch1 to ch4) connected to the mixers 4, respectively, and a signal processing device 19 configured to process data of the A/D converters 5.

Alternatively, the radar device 1 may include a receiving circuit dedicated for each receiving antenna, or may be include a receiving circuit configured to collectively receive reception signals of all receiving antennae. In this case, control for performing switching on the receiving antennae is required such that the receiving antennae sequentially correspond to the receiving circuit in a time division manner; however, it is possible to make the circuit configuration of the radar device 1 compact. In the present embodiment, a receiving antenna 3, a mixers 4, and an A/D converter 5 constitute one form of a receiving unit. In FIG. 2, an example having four receiving units is shown. However, the number of receiving units is not limited thereto, and may be arbitrarily set according to required performance and the like.

The radar device 1 of the present embodiment uses an FCM (Fast Chirp Modulation) system, and a method of computing distance and relative velocity in the FCM system will be first described in brief. The radar device 1 generates a transmission signal (chirps) ST in which the frequency varies like a saw-tooth wave as shown in (A) of FIG. 1 by the signal generating unit 9, and modulates the transmission signal by the oscillator 8, and transmits the transmission signal through the transmitting antenna 7. In FIG. 1, a symbol "Tm" is the period of the transmission signal ST which is generated by the signal generating unit 9, and is, for example, 10 µs to 50 µs. Also, one chirp (the waveform of one period) of the transmission signal ST has a saw-tooth shape in which the frequency increases with an inclination θ from a reference frequency f0 with time, and almost vertically returns to the reference frequency f0 if reaching a maximum value f1. However, the transmission signal ST may be generated such that the waveform of each period has a reverse saw-tooth shape in which the frequency almost vertically increases to the maximum value f1, and then decreases to the reference frequency f0 with the inclination θ with time. The radar device 1 consecutively transmits a plurality of chirps determined on the basis of a desired detection velocity range and a desired velocity resolution, that is, requirement specifications for radar performance, and transmits a predetermined number of chirps for one scan.

Figure 3:
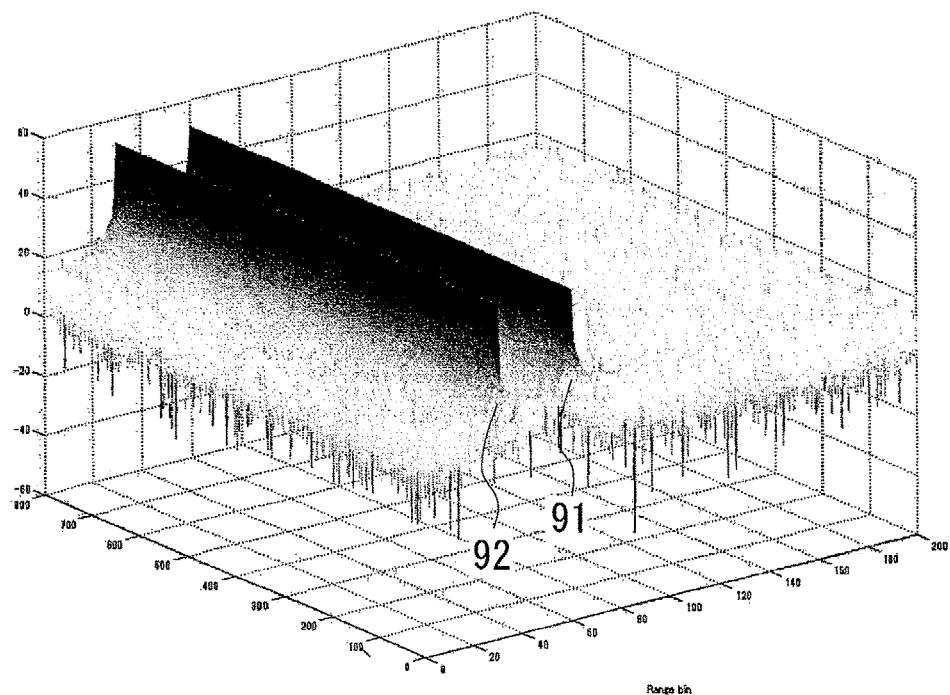
FIG. 3 is a view illustrating a result of a Fourier transform process of a range bin direction.

Thereafter, the radar device 1 receives reflected waves from a target, as reception signals SR, through the receiving antennae 3. The mixers 4 (ch1 to ch4) mix the reception signals SR with portions of the transmission signal ST, and computes the absolute values of the differences between the transmission signal ST and the reception signals SR, thereby generating beat signals SB as shown in (B) of FIG. 1. The beat signals SB are generated for each period Tm of the transmission signal shown in (A) of FIG. 1. In this case, since the time (delay time) from when the transmission signal ST shown in (A) of FIG. 1 is transmitted to when the reflected wave of the transmission signal from the target is received as a reception signal SR varies in proportion to the distance between the target and the radar device, the frequency of each beat signal SB (for example, B1) is proportional to the distance. Therefore, if an FFT (Fast Fourier Transform) is performed is performed on each beat signal SB, a peak appears at the position of a frequency corresponding to the distances of the target. Also, since an FFT can extract a reception level and phase information at each of frequency points (hereinafter, also referred to as range bins) set at intervals of a predetermined frequency, accurately, a peak appears at the range bin of a frequency corresponding to the distance of the target. Therefore, it is possible to obtain the distance to the target by detecting the peak frequency. FIG. 3 shows an example obtained by arranging the results of such an FFT process in a range bin direction in a matrix, and arranging the results of individual beat signals in a direction perpendicular to the range bin direction in the matrix, and representing the value of each process result (spectrum (dB)) in a height direction. The example of FIG. 3 has two peaks 91 and 92.

Figure 4:
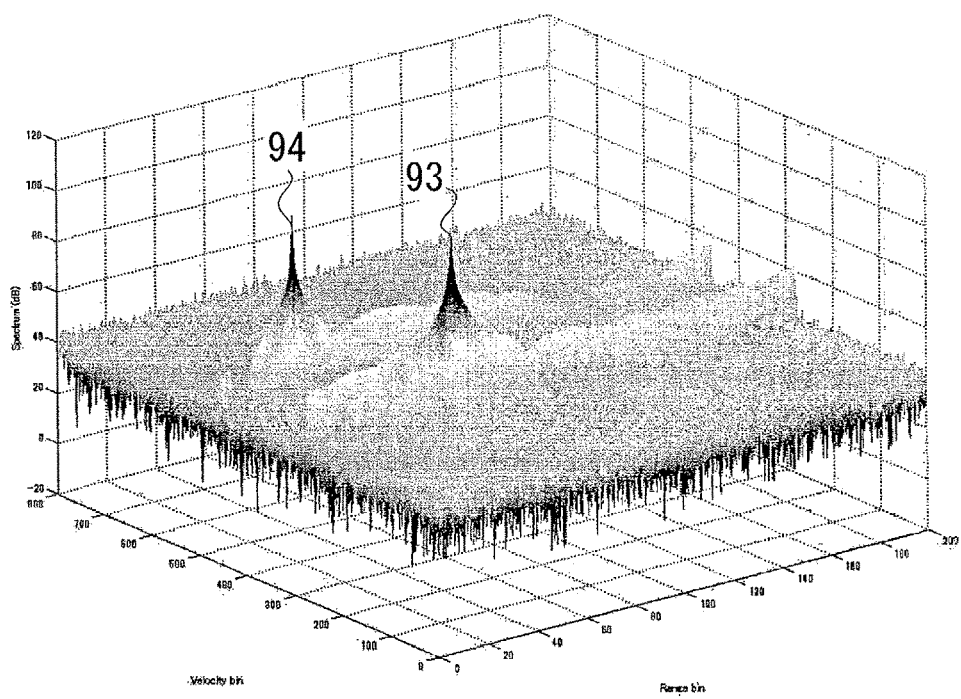
FIG. 4 is a view illustrating a result of a Fourier transform process of a velocity bin direction.

Now, relative velocity computation will be described. In a case where there is a relative velocity between the vehicle and the target, the FCM system detects a Doppler frequency between the beat signals, using phase change attributable to the Doppler frequency, thereby computing the relative velocity. In other words, if the relative velocity is 0, since there is no Doppler component between the reception signals, all of the phases of the reception signals related to the individual chirps become same. Meanwhile, in a case where there is a relative velocity between the vehicle and the target, a Doppler phase change occurs between the reception signals related to the individual chirps. Since peak information obtained by performing an FFT process on the beat signals includes such phase information, if the peak information of the same target obtained from the individual beat signals is arranged in time series, and a second FFT is performed, the Doppler frequency is obtained from the phase information, and a peak appears at the position of the obtained frequency. This FFT process extracts phase information for each of frequency points (hereinafter, also referred to as velocity bins) set at intervals of a predetermined frequency according to velocity resolution, and thus the peak appears at the velocity bin of a frequency corresponding to the relative velocity of the target. Therefore, it is possible to obtain the relative velocity of the target by detecting the peak frequency. FIG. 4 shows an example obtained by arranging the results of a second FFT process in the velocity bin direction in a matrix, and arranging the results of the second FFT process at frequency points determined at regular intervals, in the range bin direction, in the matrix, and representing the value of each process result (spectrum (dB)) in the height direction. The example of FIG. 4 has two peaks 93 and 94.

The A/D converters 5 (ch1 to ch4) acquire the beat signals SB from the mixers 4 (ch1 to ch4), respectively, and perform sampling on the beat signals SB which are analog signals, at a predetermined frequency, thereby converting the beat signals into digital signals. In the FCM system, since chirps having a period shorter than that in the FMCW system, the A/D converters 5 faster than those in the FMCW system are used.

The signal processing device 19 is a so-called computer having a processor 6 configured to perform arithmetic processing on signals according to a computer program, and a memory 16 for storing information related to arithmetic processing. The memory 16 may be composed of a plurality of memories, such as an auxiliary storage unit for storing the computer program and setting values and a main storage unit for temporarily storing information to be used in arithmetic processing. If electric power is supplied to the vehicle, the processor 6 executes the computer program, whereby the signal processing device 19 implements function units such as a transmission control unit 10, a frequency analyzing unit 11, a peak extracting unit 12, a bearing computing unit 13, a distance/relative-velocity computing unit 14, and an aliasing determining unit 15. For example, the transmission control unit 10 controls the signal generating unit 9 such that the signal generating unit generates a transmission signal on the basis of a plurality of preset parameters (individual parameters to be described below), and outputs the transmission signal. In the present embodiment, the transmission control unit 10, the signal generating unit 9, the oscillator 8, and the transmitting antenna 7 constitute one form of a transmitting unit.

Figure 5:
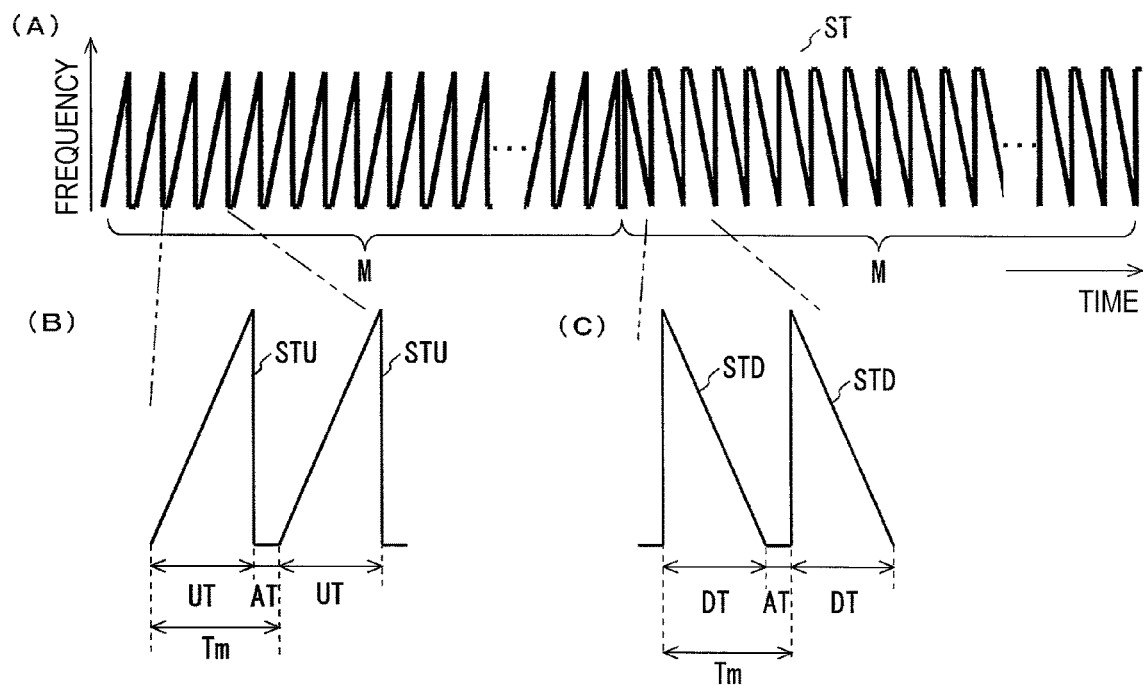
FIG. 5 is a view illustrating an example of a transmission signal.

FIG. 5 is a view illustrating an example of a saw-tooth transmission signal ST which is transmitted by the transmitting unit. In FIG. 5, (A) shows a portion of the transmission signal ST necessary for one scanning event, and (B) and (C) show enlarged views of portions of the transmission signal ST. The transmitting unit transmits the transmission signal ST in which an up period UT in which the frequency increases and a down periods DT in which the frequency decreases are repeated. In the example of (B) of FIG. 5, portions of the transmission signal (hereinafter, also referred to as up chirps) STU included in the up periods UT, respectively, and frequency-modulated such that the frequency increases linearly with time alternate with idle periods AT, with a period Tm, and the transmitting unit transmits a predetermined number M of up chirps STU (wherein M is the number of chirps) in a saw-tooth wave shape as shown in (A) of FIG. 5. Meanwhile, in the example of (C) of FIG. 5, portions of the transmission signal (hereinafter, also referred to as down chirps) STD included in the down periods DT, respectively, and frequency-modulated such that the frequency decreases linearly with time alternate with idle periods AT, with the period Tm, and the transmitting unit transmits a predetermined number M of down chirps STD (wherein M is the number of chirps) in a reverse saw-tooth wave shape as shown in (A) of FIG. 5. In other words, for each scanning event, the transmitting unit of the present embodiment transmits M-number of up chirps STU and M-number of down chirps STD with the period Tm.

Figure 6:
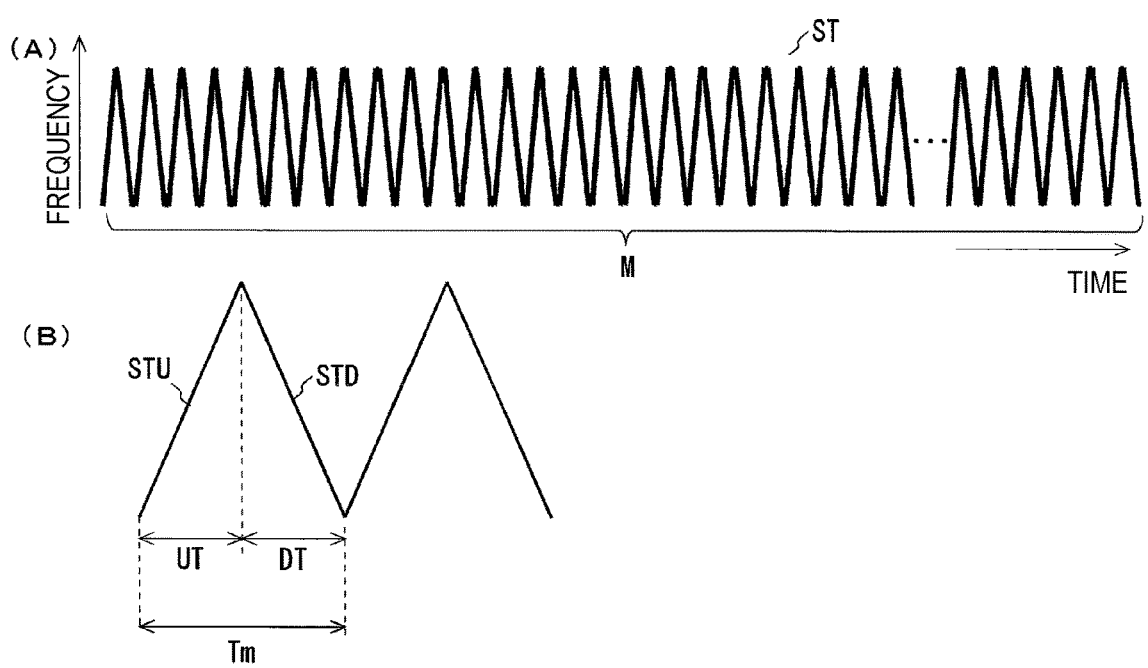
FIG. 6 is a view illustrating another example of the transmission signal.

However, the waveform of the transmission signal is not limited to the example of FIG. 5 composed of saw-tooth waves and reverse saw-tooth waves, and may be a triangular waveform as shown in FIG. 6. FIG. 6 is a view illustrating an example of a triangular transmission signal ST which is transmitted by the transmitting unit. In FIG. 6, (A) shows a portion of the transmission signal ST necessary for one scanning event, and (B) shows an enlarged view of a portion of the transmission signal ST. In the example of (B) of FIG. 6, a triangular wave is composed of an up chirp STU of an up period UT frequency-modulated such that the frequency increases linearly with time, and a down chirp STD of a down period DT frequency-modulated such that the frequency decreases linearly with time, and this triangular wave is repeated with the period Tm, and the transmitting unit transmits a predetermined number M of triangular waves (wherein M is the number of chirps) as shown in (A) of FIG. 6. In other words, even in this case, whenever performing scanning once, the transmitting unit transmits M-number of up chirps STU and M-number of down chirps STD with the period Tm.

As a result, the receiving units (the receiving antennae 3, the mixers 4, and the A/D converters 5) of the present embodiment receive the reflected waves of the up chirps STU from targets as reception signals, and receive the reflected waves of the down chirps STD from targets as reception signals, and generate beat signals with respect to the reception signals, respectively. Especially, in the case of transmitting the triangular transmission signal ST as shown in FIG. 6, since triangular waves are received as reception signals SR, the receiving units generate up-side beat signals on the basis of reception signals SR corresponding to the up periods UT of the triangular waves, and generate down-side beat signals on the basis of reception signals SR corresponding to the down periods DT of the triangular waves, and the generated beat signals are used in relative velocity computation.

Since the reflected waves from the target are superimposed and received as a reception signal SR, the frequency analyzing unit 11 performs a process of separating a high-frequency component based on each reflected wave from the target, from beat signals SB generated on the basis of the reception signal SR. For example, the frequency analyzing unit 11 performs an FFT process on the beat signals SB, thereby obtaining the process result for each of the range bins set at intervals of the predetermined frequency. Hereinafter, an FFT process for obtaining a process result for each range bin will also be referred to as an FFT process of a range bin direction. Further, the frequency analyzing unit 11 performs an FFT process on the process results of the FFT process of the range bin direction, for each of range bins common to the plurality of beat signals, thereby obtaining the process result for each of velocity bins set at intervals of the predetermined frequency. Hereinafter, an FFT process for obtaining a process result for each velocity bin will also be referred to as an FFT process of a velocity bin direction. In the present embodiment, as an example of a frequency analyzing process which is performed by the frequency analyzing unit 11, Fourier transform, particularly, fast Fourier transform is shown. However, the present invention is not limited thereto. As long as it is possible to obtain a frequency according to the distance between the vehicle and each target, and a frequency according to the relative velocity of each target, other frequency analyzing algorithm such as wavelet conversion may be used.

The peak extracting unit 12 detects individual peaks from the result of the FFT process of the range bin direction and the result of the FFT process of the velocity bin direction. The bearing computing unit 13 measures the bearing of each target on the basis of the reception signals received through the receiving antennae 3 (ch1 to ch4). The distance/relative-velocity computing unit 14 obtains a distance and a relative velocity corresponding to each peak detected by the peak extracting unit 12. The distance/relative-velocity computing unit 14 detects the frequency of each peak generated by the FFT process of the range bin direction, that is, a range bin at which a peak according to the distance between each target and the vehicle has been generated, thereby obtaining the distance to the corresponding target. Especially, the distance/relative-velocity computing unit 14 of the present embodiment computes the distance between each target and the vehicle based on reception signals corresponding to the up periods, as an up-side distance, and computes the distance between each target and the vehicle based on reception signals corresponding to the down periods, as a down-side distance. In other words, in the present embodiment, the distance/relative-velocity computing unit 14 is one form of a distance measuring unit.

Also, the distance/relative-velocity computing unit 14 detects the frequency of each peak generated by the FFT process of the velocity bin direction, that is, each velocity bin at which a peak according to the relative velocity of a target has been generated, thereby obtaining the relative velocity of the corresponding target. Especially, the distance/relative-velocity computing unit 14 of the present embodiment computes an up-side relative velocity on the basis of the reception signals corresponding to the up periods, and computes a down-side relative velocity on the basis of the reception signals corresponding to the down periods, and computes the relative velocity between a target and the vehicle on the basis of at least one of the up-side relative velocity and the down-side relative velocity and the result of determination on velocity aliasing performed by the aliasing determining unit 15. Also, the distance/relative-velocity computing unit 14 corrects the relative velocity on the basis of the number of times of aliasing obtained by the aliasing determining unit 15, thereby computing the relative velocity of the corresponding target. In other words, in the present embodiment, the distance/relative-velocity computing unit 14 is one form of a velocity measuring unit.

The aliasing determining unit 15 performs determination on velocity aliasing on the basis of the difference between the up-side distance and the down-side distance (the difference between range bins). Also, the aliasing determining unit 15 obtains the number of times of aliasing on the basis of the difference between the up-side distance and the down-side distance.

The signal processing device 19 is configured, for example, as a micro control unit (MCU). However, the present invention is not limited thereto. As long as it is possible to implement the functions of the individual function units 10 to 14, any other configuration can be used. Also, the processor 6 executes the computer program in cooperation with the memory 16, whereby the individual function units 10 to 14 are implemented. However, for convenience of explanation, in FIG. 2, the individual function units are shown in the processor 6. Also, these function units are not limited to components which the general-purpose processor 6 implements on the basis of the computer program (software). For example, all or some of the function units may be implemented by a dedicated arithmetic circuit (hardware) disposed inside or outside the processor 6.

(Velocity Aliasing)

As described above, in the FCM system, velocity measurement is performed by performing an FFT process on the phase change between the reception signals SR received consecutively. At this time, if the relative velocity of the target exceeds the detection velocity range, velocity aliasing occurs, and the relative velocity is falsely detected as a velocity in the detection velocity range. The reason is that, since velocity measurement is performed on the basis of the phase change between the reception signals SR, a Doppler frequency is sampled at the period of the reception signals SR, that is the period of chirps, and twice the period of chirps becomes the upper limit of detection velocity by the sampling theorem, and if one period of the Doppler frequency becomes less than twice the period of chirps (in other words, a case where the target has a relative velocity at which the target moves by a distance equal to or longer than half of the Doppler frequency between chirps), the Doppler frequency cannot be correctly sampled, and is detected as an alias signal (aliasing).

Figure 7:
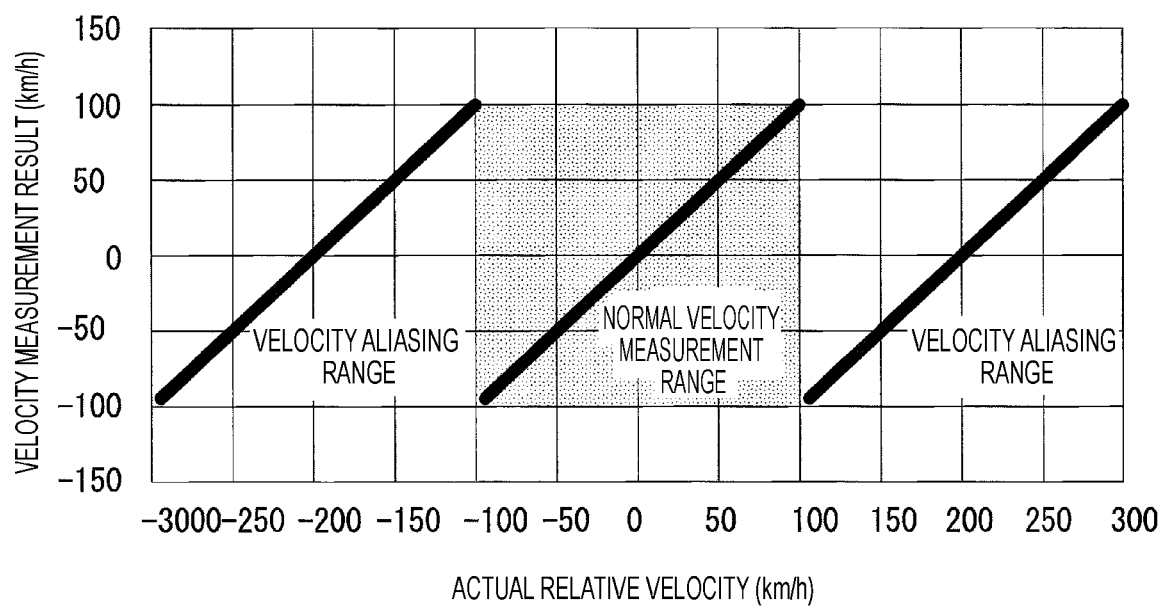
FIG. 7 is an explanatory view of aliasing in velocity.

FIG. 7 is an explanatory view of aliasing in velocity, and shows a graph illustrating the relation between actual relative velocities and velocity measurement results in a case where a detection velocity range Vmax is 100 km/h. In the graph of FIG. 7, the actual relative velocities are shown on the transverse axis, and the velocity measurement results are shown on the longitudinal axis, and a shaded portion (between −100 km/h and 100 km/h) represents a range in which velocity measurement results are equal to actual relative velocities, that is, a range in which velocity aliasing does not occur, and the other portions represent ranges in which aliasing velocity occurs.

In the range between −100 km/h and 100 km/h, the velocity measurement results are equal to the actual relative velocities, like a case where an actual relative velocity is −50 km/h and a velocity measurement result also is −50 km/h, and a case where an actual relative velocity is 0 km/h and a velocity measurement result also is 0 km/h. In other words, the velocity measurement results based on bins at which peaks have been generated are equal to the actual relative velocities. However, if an actual relative velocity exceeds the detection velocity range Vmax, a peak based on the corresponding actual relative velocity appears at a bin which is an aliasing position in the detection velocity range, and thus a velocity which is not equal to the actual relative velocity is falsely detected as a velocity measurement result. For example, in a case where an actual relative velocity is −250 km/h, −50 km/h is falsely detected as a velocity measurement result, and in a case where an actual relative velocity is 300 km/h, 100 km/h is falsely detected as a velocity measurement result.

In other words, when an actual relative velocity is $V_R$, and a velocity measurement result is $V_{FFT}$, if $V_R$ is in a range larger than −Vmax and equal to or less than Vmax (in FIG.

7, the range larger than −100 km/h and equal to or less than 100 km/h), $V_R$ and $V_{FFT}$ become equal to each other. However, as described above, when the actual relative velocity is out of that range, a relative velocity in the detection velocity range is falsely detected, and the relation between $V_R$ and $V_{FFT}$ is expressed as Expression 1.

$$V_{FFT}=((V_R+V\text{max})\bmod 2\cdot V\text{max})-V\text{max} \quad \text{(Expression 1)}$$

Also, when the velocity measurement result is $V_{FFT}$, an actual relative velocity $V_{CQ}$ in a case where Q-number of times of aliasing has occurred can be expressed as Expression 2. Here, Q represents the number of times of aliasing, and has a positive value in a case where aliasing occurs in a positive direction, and has a negative value in a case where aliasing occurs in a negative direction.

$$V_{CQ}=V_{FFT}+2\times Q\times V_{max} \quad \text{(Expression 2)}$$

As described above, if an actual relative velocity exceeds the detection velocity range Vmax, velocity aliasing occurs. For this reason, it is necessary to highly set the requirement specifications of the radar device 1 with respect to the relative velocities of targets which can be detected, that is, it is necessary to widely set the detection velocity range Vmax. However, in order to widely set the detection velocity range Vmax, it is necessary to set the period of chirps short, and the A/D converters 5 needs to be fast. Due to there restrictions on design, it is impossible to widely set the detection velocity range Vmax without any limit.

For this reason, in the present embodiment, the radar device transmits the up chirps STU and the down chirps STD as the transmission signal ST, and computes the up-side distance and the up-side relative velocity on the basis of the reception signals SR corresponding to the up chirps STU while computing the down-side distance and the down-side relative velocity on the basis of the reception signals SR corresponding to the down chirps STD, and performs determination on velocity aliasing on the basis of the difference between the up-side distance and the down-side distance, and corrects the up-side or down-side relative velocity on the basis of the determination result, thereby obtaining the relative velocity of the target. Although a general FCM type radar device performs measurement using either up chirps STU or down chirps STD, in the present embodiment, the radar device performs measurement using all of the up chirps STU and the down chirps STD, thereby obtaining the up-side distance and the down-side distance. In this case, between the up-side distance and the down-side distance, a difference according to the relative velocity of the target is generated, like in the FM-CW system. If this difference is large, the radar device determines that velocity aliasing has occurred, and performs correction according to the velocity aliasing, thereby obtaining the relative velocity of the target. However, since the radar device 1 of the present embodiment is an FCM type, and the period of chirps is significantly shorter than that in the FM-CW system, it is not possible to obtain relative velocities at a velocity resolution satisfying requirement specifications, on the basis of the differences between up-side distances and down-side distances. For this reason, in the present embodiment, the radar device uses the difference between the up-side distance and the down-side distance to perform determination on aliasing, and obtains the relative velocity obtained on the basis of phase changes in the reception signals SR during reflection from the target, and corrects the obtained relative velocity on the basis of the result of determination on aliasing, thereby obtaining the velocity measurement result.

Therefore, even in a case where the actual relative velocity of the target has exceeded the detection velocity range, whereby velocity aliasing has occurred, it is possible to obtain an accurate value as the velocity measurement result.

(Measuring Method)

Hereinafter, a process flow which the processor 6 performs in a case where electric power is supplied from the vehicle to the radar device 1 will be described with reference to the flow charts of FIGS. 8A and 8B. In a case where the driving source of the vehicle is operating, for example, if the driving source is an internal combustion engine, in a case where an ignition switch is in an ON state, or if the driving source is a hybrid system or an EV (electric vehicle) system, in a case where the power of the system is in an ON state, the processor 6 repeats the following process flow.

In STEP S10, the processor 6 instructs the signal generating unit 9 to generate and output a transmission signal ST according to a parameter preset depending on the requirement specifications of the radar device 1. For example, the number M of chirps necessary for performing velocity measurement in a predetermined detection velocity range at a predetermined velocity resolution Vmin is the same as the number $N_V$ of velocity bins, and is determined by Expression 3.

$$M=N_V=2*V\text{max}/V\text{min} \quad \text{(Expression 3)}$$

Also, the period Tm (FIG. 1) of the transmission signal ST (chirps) is determined according to a velocity resolution, and the bandwidth ΔF of the transmission signal ST is determined according to a detection distance range, and the number M of chirps, the period Tm, and the bandwidth ΔF are set in advance. Especially, in the present embodiment, in order to transmit the up chirps STU and the down chirps STD based on those parameters, an instruction is issued. If the transmission signal ST generated on the basis of that instruction is transmitted, and reflected waves from targets are received as reception signals SR, the mixers 4 obtain the differences between the transmission signal ST and the reception signals SR, thereby generating beat signals SB, and the A/D converters 5 (ch1 to ch4) perform A/D conversion on the beat signals SB. Also, in a case of sequentially transmitting the predetermined number M of up chirps STU and the predetermined number M of down chirps STD as the transmission signal ST as shown in FIG. 5, beat signals SBU based on the up chirps STU (hereinafter, beat signals SBU will also be referred to as the up-side beat signals) are sequentially generated, and then beat signals SBD based on the down chirps STD (hereinafter, beat signals SBD will also be referred to as down-side beat signals) are sequentially generated. Meanwhile, in a case of transmitting triangular waves as the transmission signal ST as shown in FIG. 6, up-side beat signals SBU which are generated from the portions of the transmission signal corresponding to the up chirps STU of the triangular waves, and down-side beat signals SBD which are generated from the portions of the transmission signal corresponding to the down chirps STD of the triangular waves are separated, whereby M-number of up-side beat signals SBU and M-number of down-side beat signals SBD are generated for each scanning event.

In STEP S20, the processor 6 acquires the up-side beat signals SBU subjected to A/D conversion in the A/D converters 5 (ch1 to ch4), and performs a two-dimensional FFT process, that is, a two-dimensional FFT process based on the up chirps STU. FIG. 8B is a view illustrating a specific example of the two-dimensional FFT process. In STEP S20, as shown in FIG. 8B, in STEP S110, the processor 6 first acquires the beat signals generated on the basis of the reception signals SR corresponding to the up periods, that is, the up-side beat signals SBU generated on the basis of the up chirps STU. These up-side beat signals SBU are time-series data obtained by performing A/D conversion at a predetermined sampling frequency. Subsequently, in STEP S120, the processor 6 analyzes one up-side beat signal SBU in time series by performing an FFT process on the up-side beat signals SBU in the range bin direction. The processor 6 repeats the process of STEP S120 on each the M-number of up-side beat signals SBU (STEP S130). For explanation, (C) of FIG. 1 shows a matrix pattern in which values R1 to RJ obtained at predetermined frequency intervals as the result BF1 of the FFT process of the beat signal B1 are arranged at the range bins RA1 to RAJ of the corresponding frequencies, and the results BF2 to BFM of the FFT processes of the individual beat signals B2 to BM are arranged in the direction perpendicular to the range bins. FIG. 3 shows an example in which the results of Fourier transform processes of the range bin direction are arranged on a plane as described above and which represents the values (spectrum (dB)) of the individual process results in a height direction. However, this matrix-like arrangement is for convenience of explanation, and is not limited to a case where the result values are physically stored in that arrangement.

Subsequently, in STEP S140, with respect to the results of the Fourier transform processes of the range bin direction, the processor 6 performs an FFT process of the velocity bin direction on time-series data related to the same distance, that is, the same range bin. At this time, the processor 6 repeats the FFT process of STEP S140 until the number of FFT processes reaches a predetermined number $N_R$ of times, that is, the number $N_R$ of range bins (STEP S150). Specifically, if the number of FFT processes is not $N_R$ ("No" in STEP S150), the processor returns to STEP S140; whereas if the number of FFT processes is $N_R$ ("Yes" in STEP S150), the processor proceeds to STEP S30. As shown in FIG. 3, the results of the FFT process of the velocity bin direction are arranged in a matrix of the range bin direction and the velocity bin direction, and the values of the process results are represented in the height direction.

Subsequently, in STEP S30, the processor 6 acquires the down-side beat signals SBD subjected to A/D conversion in the A/D converters 5 (ch1 to ch4), and performs a two-dimensional FFT process, that is, a two-dimensional FFT process based on the down chirps STD. This two-dimensional FFT process is the same as that of STEP S20, except that the process of STEP S20 is performed on the up-side beat signals SBU, whereas the process of STEP S30 is performed on the down-side beat signals SBD. In other words, the same process as that of FIG. 8B may be performed on the down-side beat signals SBD. Therefore, a description of the process of STEP S30 will not be made.

Figure 9:
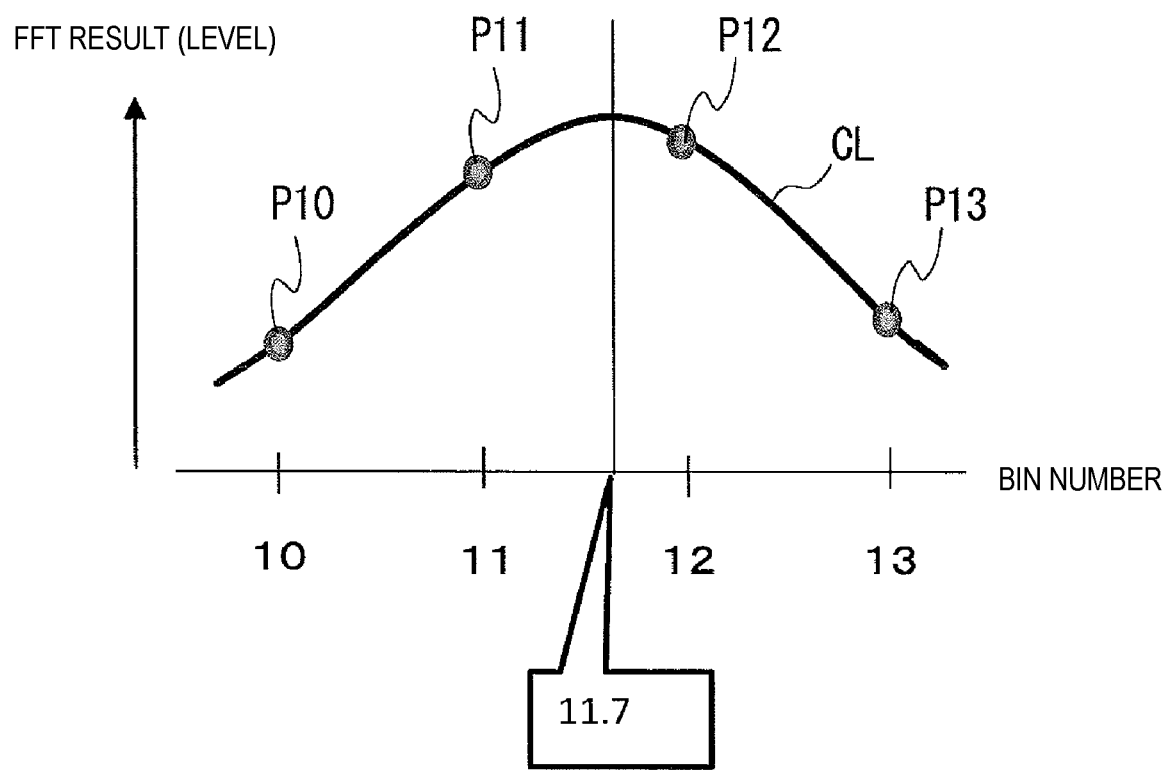
FIG. 9 is an explanatory view of peak detection.

Subsequently, the processor 6 detects peaks from the results of the two-dimensional FFT process of STEP S20 based on the up chirps STU (hereinafter, these peaks will also be referred to as up-side peaks), in STEP S40, and detects peaks from the results of the two-dimensional FFT process of STEP S30 based on the down chirps STD (hereinafter, these peaks will also be referred to as down-side peaks), in STEP S50. FIG. 9 is an explanatory view of the peak detection. In FIG. 9, on the transverse axis, bin numbers are shown, and on the longitudinal axis, FFT result values are shown in dB. On the transverse axis, the bin numbers of FFT results P10 to P13 are shown. The bin numbers are frequency points determined at predetermined intervals, and the FFT results P10 to P13 are discretely computed at those frequency points. These FFT results P10 to P13 are approximated by a curve CL, and if the curve CL exceeds a predetermined threshold value, it is detected as a peak, and the position of maximum value of that peak on the transverse axis is obtained as the position of the peak. In the example of FIG. 9, the maximum value is between bin No. 11 and bin No. 12, and the peak position is 11.7. Like this, in the present embodiment, discrete values are computed as the FFT result values; however, since peaks are detected by approximating those values in a curve shape, consecutive values are obtained as the positions of the peaks.

Also, with respect to the up-side peaks and the down-side peaks, the processor 6 determines a combination of peaks based on each target. Since an up-side peak and a down-side peak based on one target are generated at almost same positions on the range bins and the velocity bins, the processor may combine peaks generated at close positions. However, in a case where velocity aliasing has occurred, a difference of several bins occurs between the range bin positions of the up-side peak and the down-side peak; however, the velocity bin positions of the up-side and down-side peaks are the same as each other. For this reason, in the strict sense, it is possible to determine a combination of peaks based on each target by combining peaks having range bin positions closest to each other. Also, although not shown in the process of FIG. 8A, it is possible to obtain the bearings of the individual peaks by the bearing computing unit 13, and determine combinations of peaks on the basis of the bearings of the peaks, and it is possible to add a condition that the reception strengths of an up-side peak and a down-side peak to be combined should be almost the same, as a combination determination condition.

Subsequently, in STEP S70, with respect to each combination determined in STEP S60, the processor 6 obtains the difference in the range bin position (bin difference) between the up-side peak and the down-side peak. Next, in STEP S80, on the basis of the bin difference, the processor determines whether velocity aliasing has occurred. The reason why determination on aliasing is performed on the basis of the difference in the range bin position is that, during reflection from the target, a slight Doppler shift occurs due to the velocity of a target, whereby a difference occurs between the frequencies of the up-side beat signal SBU and the down-side beat signal SBD of a reception signal, and this difference appears as a difference in the range bin position. For example, it is possible to obtain the difference in the range bin position between an up-side peak and a down-side peak in a case where velocity aliasing occur, as a threshold value, in advance. In this case, if a difference in the range bin position is equal to or greater than the threshold value, the processor determines that aliasing has occurred; whereas if a difference in the range bin position is less than the threshold value, the processor determines that velocity aliasing has not occurred. Alternatively, it is possible to obtain the difference in the range bin position between an up-side peak and a down-side peak, whenever aliasing occurs, and store the obtained values in association with values representing the number of times of aliasing, in advance. In this case, if the difference in the range bin position between an up-side peak and a down-side peak is equal to a value associated with n-th aliasing, the processor may determine that n-th velocity aliasing has occurred.

Subsequently, in STEP S90, the processor obtains an up-side relative velocity and a down-side relative velocity from the range bin positions of the up-side peak and the down-side peak, and corrects the average of the up-side and down-side relative velocities on the basis of the result of the determination on velocity aliasing, thereby obtaining a velocity measurement result, and outputs the velocity measurement result. In this example, both of the up-side relative velocity and the down-side relative velocity are used to correct the average of them. However, the present invention is not limited thereto, and it is also possible to correct at least one of the up-side relative velocity and the down-side relative velocity, thereby obtaining a velocity measurement result.

For example, in a case where the average of an up-side relative velocity and a down-side relative velocity is a relative velocity $V_{FFT}$, and the number of times of aliasing is Q, the relative velocity $V_{FFT}$ is corrected on the basis of Expression 2, whereby a velocity measurement result (the actual relative velocity of a target) $V_{CQ}$ is obtained. Here, the number Q of times of aliasing has a positive value in a case where aliasing occurs in a positive direction, and has a negative value in a case where aliasing occurs in a negative direction.

$$V_{CQ} = V_{FFT} + 2 \times Q \times V\text{max} \quad \text{(Expression 2)}$$

The method of obtaining the velocity measurement result is not limited to the method of obtaining the velocity measurement result by correcting the relative velocity $V_{FFT}$ by Expression 2. For example, it is possible to obtain a plurality of relative velocities which can become the relative velocity $V_{FFT}$, with respect to each of the values representing the plurality of times of aliasing, in advance, and store the obtained relative velocities, as relative velocity candidates $V_{RQ}$, in association with the relative velocity $V_{FFT}$. In this case, in STEP S90, after computing the relative velocity $V_{FFT}$ from the up-side relative velocity and the down-side relative velocity, the processor may select, as a velocity measurement result, a relative velocity candidate $V_{RQ}$ corresponding to the computed relative velocity $V_{FFT}$ and the value representing the number of times of aliasing.

For example, when n-th aliasing in the negative direction is referred to as the negative n-th aliasing, and n-th aliasing in the positive direction is referred to as the positive n-th aliasing, if a relative velocity candidate in a case where the negative second aliasing has occurred is represented by $V_{R-2}$, and a relative velocity candidate in a case where the negative first aliasing has occurred is represented by $V_{R-1}$, and a relative velocity candidate in a case where the positive first aliasing has occurred is represented by $V_{R1}$, and a relative velocity candidate in a case where the positive second aliasing has occurred is represented by $V_{R2}$, with respect to the values representing the number of times of aliasing, relative velocity candidates $V_{RQ}$ for the relative velocity $V_{FFT}$ are obtained as follow.

$$V_{R-2} = V_{FFT} + 2 \times -2 \times V\text{max}$$

$$V_{R-1} = V_{FFT} + 2 \times -1 \times V\text{max}$$

$$V_{R1} = V_{FFT} + 2 \times 1 \times V\text{max}$$

$$V_{R2} = V_{FFT} + 2 \times 2 \times V\text{max}$$

These relative velocity candidates $V_{RQ}$ are obtained with respect to each of relative velocities $V_{FFT}$ determined in the detection velocity range between −Vmax and +Vmax at the velocity resolution Vmin, and are stored in a relative velocity table. In this case, in STEP S90, after computing the relative velocity $V_{FFT}$ from the up-side relative velocity and the down-side relative velocity, the processor selects a relative velocity candidate $V_{RQ}$ corresponding to the computed relative velocity $V_{FFT}$ and the value representing the number of times of aliasing, as the velocity measurement result, from the relative velocity table.

(Description of Determination on Aliasing)

FIG. 10 is an explanatory view of an up-side relative velocity and a down-side relative velocity in a case where aliasing has not occurred, and FIG. 11 is an explanatory view of an up-side relative velocity and a down-side relative velocity in a case where aliasing has occurred.

As shown in (B) of FIG. 10, in a case where an up chirp STU is reflected from a target, and is received as a reception signal SRU, the reception signal SRU is received, with a delay time from the up chirp STU depending on the distance between the target and the radar device. Thereafter, the difference RU between the up chirp STU and the reception signal SRU is obtained, whereby an up-side beat signal BU is generated.

Similarly, in a case where a down chirp STD is reflected from the target, and is received as a reception signal SRD, this reception signal SRD is received from a delay time from the down chirp STD depending on the distance between the target and the radar device. Thereafter, the difference RD between the down chirp STD and the reception signal SRD is obtained, whereby a down-side beat signal BD is generated.

In this case, if the relative velocity of the target is low, and aliasing has not occurred, since the difference between the frequencies of the up-side beat signal BU and the down-side beat signal BD is small, as shown in (A) of FIG. 10, the range bin positions of peaks 81 and 82 obtained by performing an FFT process on the beat signals BU and BD are almost the same. For example, in a case where aliasing has not occurred, the difference between the range bin positions of the peaks 81 and 82 is less than one bin.

In contrast, if the relative velocity of the target is high, and aliasing has occurred, since the difference between the frequencies of the up-side beat signal BU and the down-side beat signal BD is large, as shown in (A) of FIG. 11, a difference arises between the range bin positions of peaks 81 and 82 obtained by performing an FFT process on the beat signals BU and BD.

For example, when the beat frequency when the relative velocity is 0 is R0, and the Doppler frequency based on the relative velocity is $\Delta F$ ((C) of FIG. 11), the up-side beat frequency RU is (R0−$\Delta F$) (corresponding to the up-side distance), and the down-side beat frequency RD is (R0+$\Delta F$) (corresponding to the down-side distance). In a case where velocity aliasing has not occurred, since the Doppler frequency $\Delta F$ based on the relative velocity is small, and the difference 2$\Delta F$ between the down-side beat frequency and the up-side beat frequency is also small, and the distance difference is also small, the range bin positions are almost the same ((A) of FIG. 10).

Figure 12:
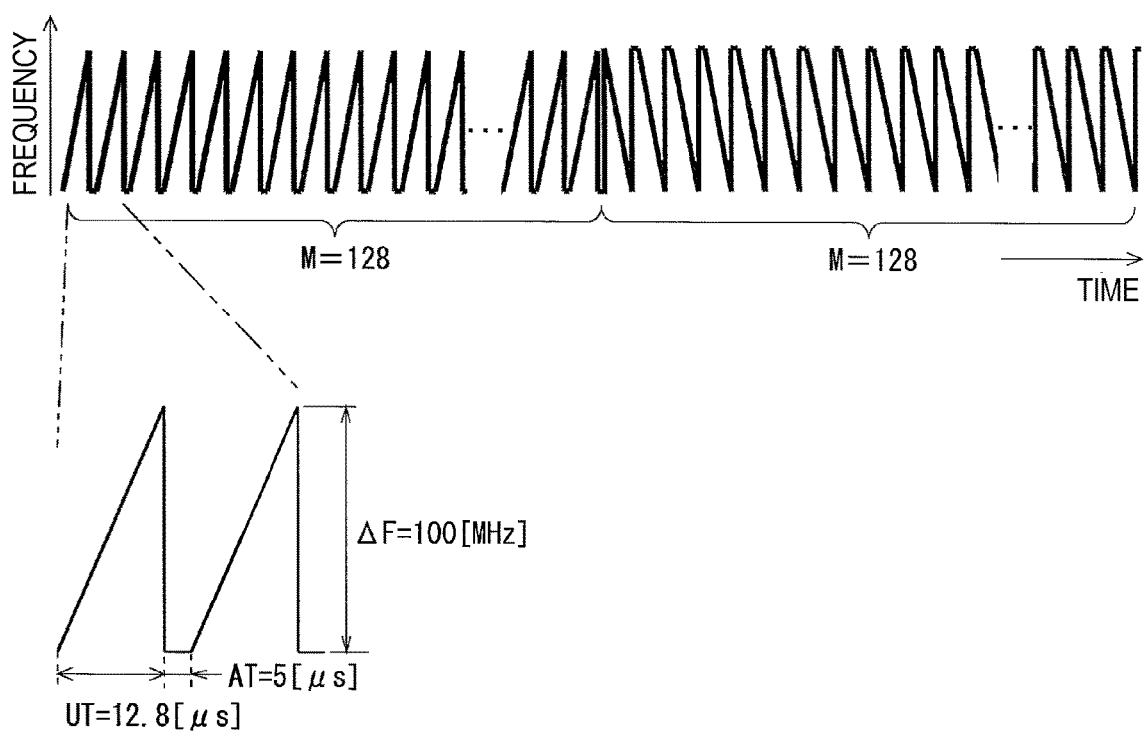
FIG. 12 is a view illustrating examples of parameters related to the transmission signal.

Meanwhile, in a case where velocity aliasing has occurred, since the relative velocity is higher than that in the case where velocity aliasing has not occurred, the Doppler frequency $\Delta F$ increases, and the difference 2$\Delta F$ between the beat frequencies also increases. Therefore, the distance difference also increases. As a result, the up-side peak and the down-side peak appear at different range bin positions. FIG. 11 shows a case where the target moves toward the radar device 1 and the relative velocity is positive. Meanwhile, if the target moves away from the radar device 1, the relative velocity becomes negative, that is, the Doppler frequency $\Delta F$ becomes a negative value. Therefore, the up-side beat frequency RU becomes (R0+$\Delta F$), and the down-side beat frequency RD becomes (R0−$\Delta F$). Now, the relation between the relative velocities at which aliasing occurs and the difference between the range bin positions of the up-side peak and the down-side peak (hereinafter, this difference will also be referred to simply as the bin difference) will be described with reference to FIGS. 12 to 17. FIG. 12 is a view illustrating examples of the parameters related to the transmission signal ST.

In the examples of FIG. 12, the number M of chirps of the transmission signal ST is 128, and the up period (modulation time) UT is 12.8 μm (the down period DT also is 12.8 μm), and the idle period AT is 5 μm, and the bandwidth AF is 100 MHz, and the sampling frequency is 10 MHz, and the number of FFT points is 128.

In a case where the parameters have been set as described above, the detection velocity range is 110.08 m/s, and if the relative velocity exceeds the detection velocity range, aliasing occurs. Therefore, the relative velocities at which aliasing occurs are ±55.04 m/s from 0. For example, in a case where the relative velocity is 55.04 m/s, the frequency difference between the up-side peak 81 and the down-side peak 82 becomes 56.18 kHz. Also, the frequency interval of one bin in the range direction becomes 75.125 kHz, which corresponds to the relative velocity of 76.54 m/s.

Figure 13:
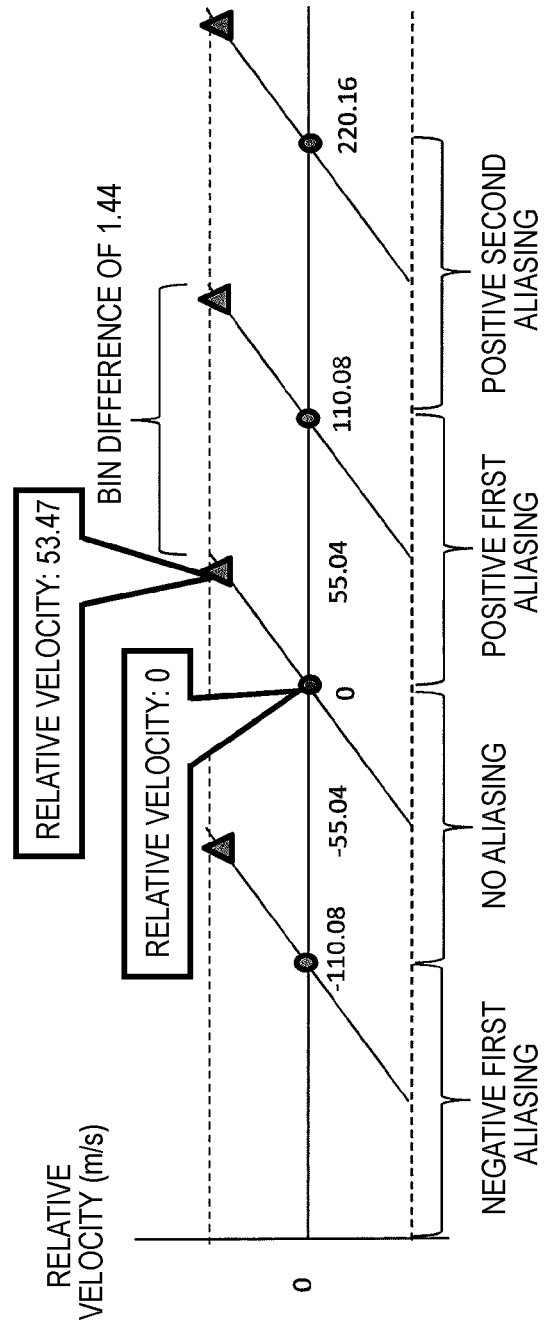
FIG. 13 is a view illustrating actual relative velocities at which aliasing in relative velocity occurs, in a case of performing velocity measurement on the basis of the parameters of FIG. 12.

FIG. 13 is a view illustrating actual relative velocities at which aliasing occurs, with respect to relative velocities $V_{FFT}$ in a case of performing velocity measurement on the basis of the parameters of FIG. 12. In FIG. 13, on the longitudinal axis, the relative velocities $V_{FFT}$ are shown, and on the transverse axis, the actual relative velocities are shown. Also, with respect to each relative velocity $V_{FFT}$, values representing the number of times of aliasing, and actual relative velocities corresponding to the values representing the number of times of aliasing are shown. Here, each relative velocity $V_{FFT}$ is a relative velocity computed on the basis of at least one of an up-side reception signal and a down-side reception signal (a computed relative velocity).

As shown in FIG. 13, in a case where a relative velocity $V_{FFT}$ is 0 m/s, if an actual relative velocity is equal to or higher than −55.04 m/s and is lower than 55.04 m/s, since the actual relative velocity falls within the detection velocity range, aliasing does not occur, and if the actual relative velocity is equal to or higher than 55.04 m/s and is lower than 165.12 m/s, the positive first aliasing occurs. Also, if the actual relative velocity is equal to or higher than 165.12 m/s and is lower than 275.20 m/s, the positive second aliasing occurs, and if the actual relative velocity is equal to or higher than −165.12 m/s and is lower than −55.04 m/s, the negative first aliasing occurs.

In other words, in the case where the relative velocity $V_{FFT}$ is 0 m/s, in the range in which the actual relative velocity is equal to or r higher than −55.04 m/s and is lower than 55.04 m/s with respect to a reference value of 0 m/s, aliasing does not occur, and in the range in which the actual relative velocity is equal to or higher than 55.04 m/s and is lower than 165.12 m/s with respect to a reference value of 110.08 m/s, the positive first aliasing occurs.

However, since the relative velocity $V_{FFT}$ is not limited to 0 m/s, and varies in the detection velocity range between −55.04 m/s and 55.04 m/s, the actual relative velocity range and the reference value corresponding to the number of times of aliasing also vary depending on the relative velocity $V_{FFT}$. For example, in a case where the relative velocity $V_{FFT}$ is 53.47 m/s, the reference value of no aliasing becomes 53.47 m/s, and the reference value of the positive first aliasing becomes 163.55 m/s, and the reference value of the positive second aliasing becomes 273.63 m/s, and the reference value of the negative first aliasing becomes −56.61 m/s, and the reference value of the negative second aliasing becomes 166.69 m/s.

Figure 14:
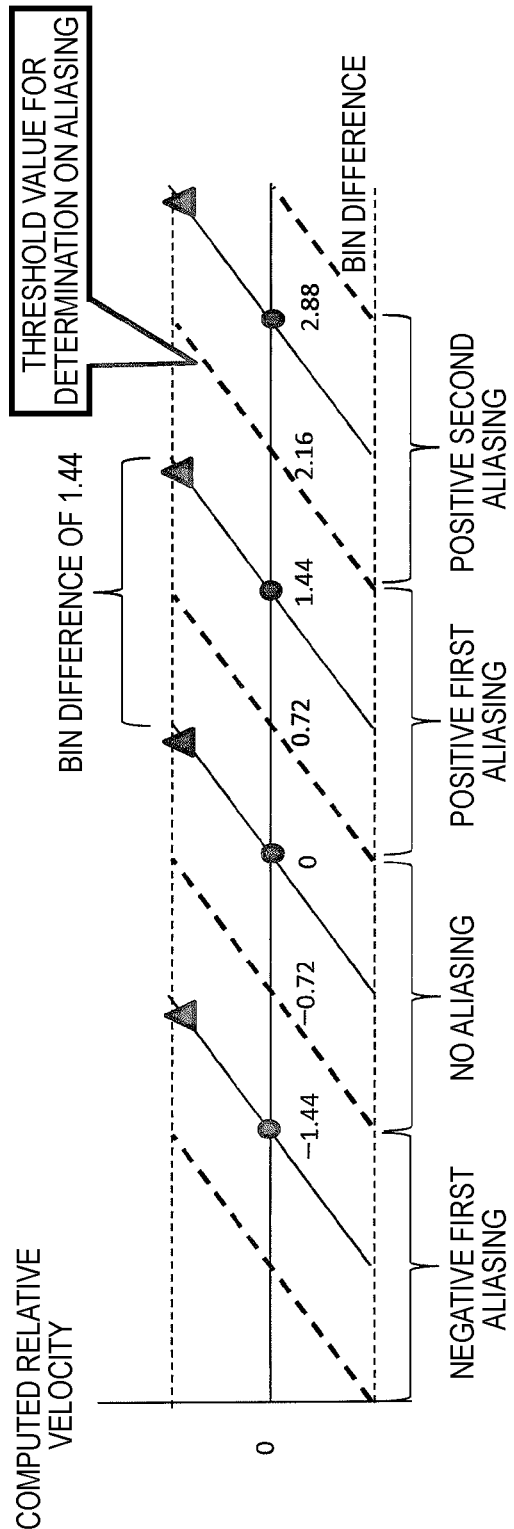
FIG. 14 is a view illustrating bin differences at which aliasing in relative velocity occurs, in the case of performing velocity measurement on the basis of the parameters of FIG. 12.

FIG. 14 is a view illustrating the relation between the values representing the number of times of aliasing and the actual relative velocities shown in FIG. 13, using bin differences in place of the actual relative velocities. In FIG. 14, on the longitudinal axis, the relative velocities $V_{FFT}$ are shown, and on the transverse axis, the bin differences are shown. Also, with respect to each relative velocity $V_{FFT}$, the values representing the number of times of aliasing, and bin differences corresponding to the values representing the number of times of aliasing are shown.

For example, in the case where a relative velocity $V_{FFT}$ is 0 m/s, in a range in which a bin difference is equal to or greater than −0.72 bins and is less than 0.72 bins with respect to a reference value of 0 bin, aliasing does not occur, and in a range in which the bin difference is equal to or greater than 0.72 bins and is less than 2.16 bins with respect to a reference value of 1.44 bins, the positive first aliasing occurs.

Also, in the case where the relative velocity $V_{FFT}$ is 53.47 m/s, the reference value of no aliasing is 0.7 bins, and the reference value of the positive first aliasing is 2.14 bins, and the reference value of the positive second aliasing is 2.58 bins, and the reference value of the negative first aliasing is −0.74 bins, and the reference value of the negative second aliasing is 2.18 bins.

FIG. 15A shows the correspondence relation of the values representing the number of times of aliasing, the actual relative velocities, and the reference values of bin differences (UPbin−Dnbin) in the case where the relative velocity $V_{FFT}$ is 0 m/s in the specific examples of FIGS. 13 and 14 described above. Also, FIG. 15B shows the correspondence relation of the values representing the number of times of aliasing, the actual relative velocities, and the reference values of bin differences (UPbin−Dnbin) in the case where the relative velocity $V_{FFT}$ is 53.47 m/s.

As shown in FIGS. 15A and 15B, the number of times of aliasing corresponding to each relative velocity $V_{FFT}$ or each bin difference can be obtained in advance. In this case, it is possible to determine the number of times of aliasing on the basis of a relative velocity $V_{FFT}$ or a bin difference.

<<First Determining Method>>

FIG. 16 is a view illustrating an example of a reference value table (data table). The reference value table of FIG. 16 contains relative velocities $V_{FFT}$, and reference values for bin differences corresponding to those relative velocities, in association with each value representing the number of times of aliasing. In the reference value table of FIG. 16, data related to the case the number of times of aliasing values is in a range from −2 to 2 are shown. However, the present invention is not limited thereto, and the reference value table may include data corresponding a case where the number of times of aliasing other values is equal to or larger than 3 or is equal to or less than −3. Also, although data related to relative velocities $V_{FFT}$ other than 53.47 m/s, 0 m/s, and −53.47 m/s are not shown in the reference value table of FIG. 16, over the entire detection velocity range (between −55.04 m/s and 55.04 m/s), in association with each of the relative velocities $V_{FFT}$ determined at the velocity resolution Vmin, reference values for bin differences may be stored. Alternatively, in association with each of discrete relative velocities $V_{FFT}$ determined at intervals wider than the velocity resolution Vmin, reference values for bin differences may be stored.

Figure 8A:
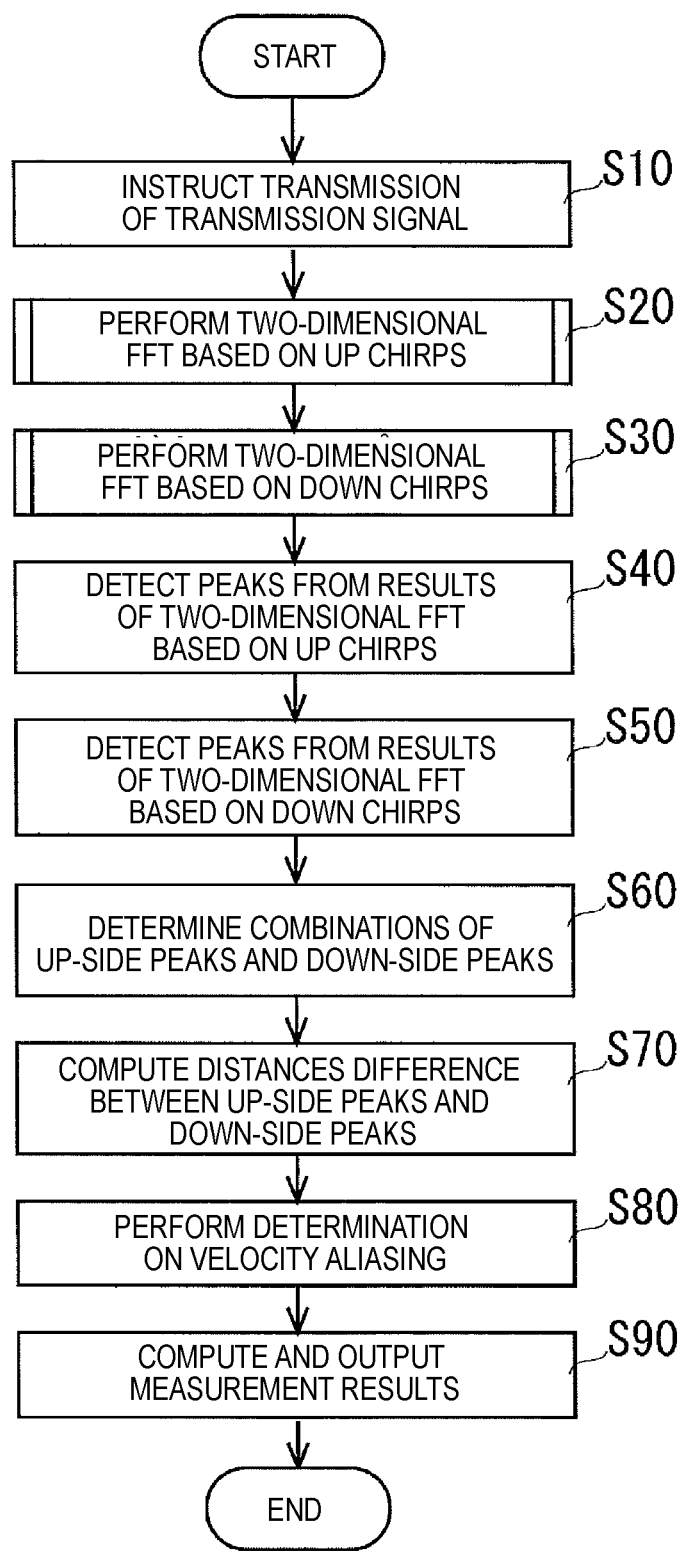
FIG. 8A is a flow chart of signal processing.
Figure 8B:
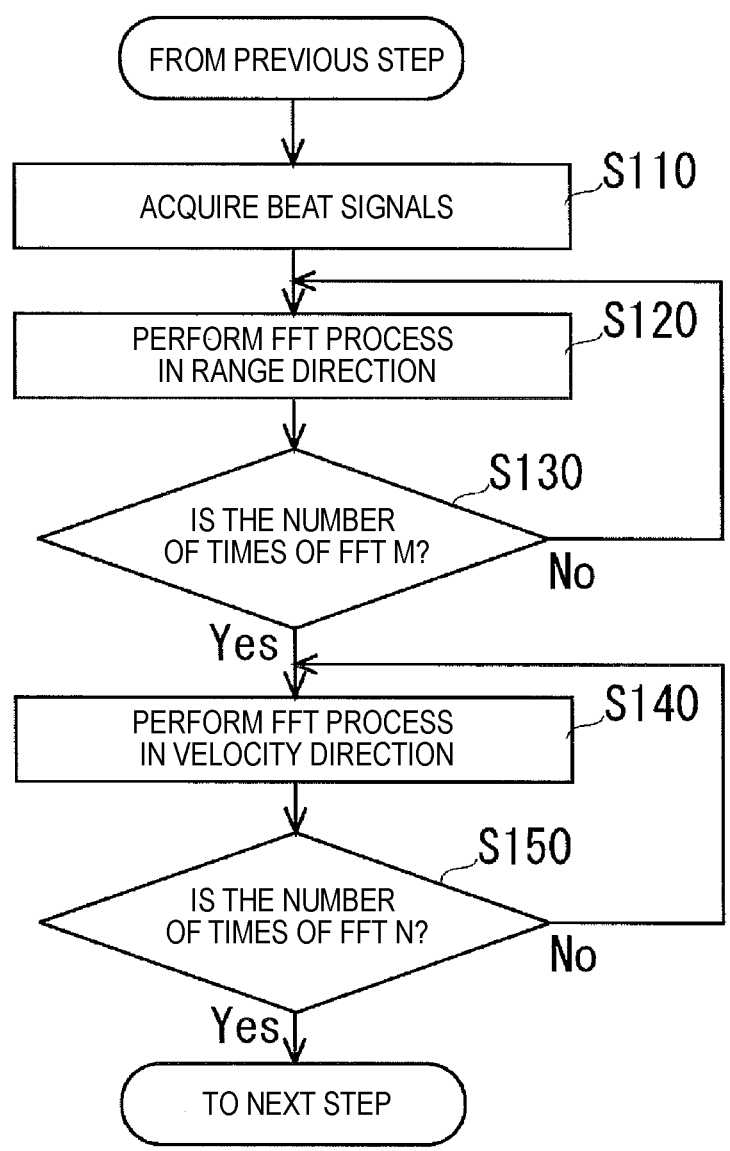
FIG. 8B is an explanatory view of a two-dimensional FFT process.

The radar device 1 performs measurement according to the flow chart of FIG. 8A as described above, thereby computing a relative velocity $V_{FFT}$, and reads out reference values for bin differences corresponding to the computed relative velocity, from the reference value table, in STEP S80, and selects a reference value closest to the bin difference obtained in STEP S70, from the read reference values, and obtains the number of times of aliasing corresponding to the selected reference value.

For example, in a case where the relative velocity $V_{FFT}$ is 0 m/s, if the bin difference obtained in STEP S70 of FIG. 8A is closest to 0 bin, the radar device determines that aliasing has not occurred, and if the bin difference is closest to 1.44 bins, the radar device determines that the positive first aliasing has occurred, and if the bin difference is closest to 2.88 bins, the radar device determines that the positive second aliasing has occurred. Also, if the bin difference is closest to −1.44 bins, the radar device determines that the negative first aliasing has occurred, and if the bin difference is closest to −2.88 bins, the radar device determines that the negative second aliasing has occurred.

Meanwhile, in a case where the relative velocity $V_{FFT}$ is 53.47 m/s, if the bin difference obtained in STEP S70 is closest to 0.7 bins, the radar device determines that aliasing has not occurred, and if the bin difference is closest to 2.14 bins, the radar device determines that the positive first aliasing has occurred, and if the bin difference is closest to 3.58 bins, the radar device determines that the positive second aliasing has occurred. Also, if the bin difference is closest to −0.74 bins, the radar device determines that the negative first aliasing has occurred, and if the bin difference is closest to −2.18 bins, the radar device determines that the negative second aliasing has occurred.

<<Second Determining Method>>

FIG. 17 is a view illustrating an example of a range table (a data table). The range table of FIG. 17 contains relative velocities $V_{FFT}$, and bin difference ranges corresponding to those relative velocities, in association with each value representing the number of times of aliasing. In the range table of FIG. 17, data related to the case the number of times of aliasing values is in a range from −2 to 2 are shown. However, the present invention is not limited thereto, and the reference value table may include data corresponding a case where the number of times of aliasing other values is equal to or larger than 3 or is equal to or less than −3. Also, although data related to relative velocities $V_{FFT}$ other than 53.47 m/s, 0 m/s, and −53.47 m/s are not shown in the range table of FIG. 17, over the entire detection velocity range (between −55.04 m/s and 55.04 m/s), in association with each of the relative velocities $V_{FFT}$ determined at the velocity resolution Vmin, bin difference ranges may be stored. Alternatively, in association with each of discrete relative velocities $V_{FFT}$ determined at intervals wider than the velocity resolution Vmin, bin difference ranges may be stored.

The radar device 1 performs measurement according to the flow chart of FIG. 8A as described above, thereby computing a relative velocity $V_{FFT}$, and reads out bin difference ranges corresponding to the computed relative velocity, from the range table, in STEP S80, and selects a range including the bin difference obtained in STEP S70, from the read ranges, and obtains the number of times of aliasing corresponding to the selected range.

For example, in a case where the relative velocity $V_{FFT}$ is 0 m/s, if the bin difference obtained in STEP S70 falls within a range equal to or greater than −0.72 bins and less than 0.72 bins, the radar device determines that aliasing has not occurred, and if the bin difference falls within a range equal to or greater than 0.72 bins and less than 2.16 bins, the radar device determines that the positive first aliasing has occurred, and if the bin difference falls within a range equal to or greater than 2.16 bins and less than 3.60 bins, the radar device determines that the positive second aliasing has occurred. Also, if the bin difference falls within a range equal to or greater than −3.60 bins and less than −2.16 bins, the radar device determines that the negative second aliasing has occurred, and if the bin difference falls within a range equal to or greater than −2.16 bins and less than −0.72 bins, the radar device determines that the negative first aliasing has occurred.

Meanwhile, in a case where the relative velocity $V_{FFT}$ is 53.47 m/s, if the bin difference obtained in STEP S70 falls within a range equal to or greater than −0.02 bins and less than 1.42 bins, the radar device determines that aliasing has not occurred, and if the bin difference falls within a range equal to or greater than 1.42 bins and less than 2.86 bins, the radar device determines that the positive first aliasing has occurred, and if the bin difference falls within a range equal to or greater than 2.86 bins and less than 4.30 bins, the radar device determines that the positive second aliasing has occurred. Also, if the bin difference falls within a range equal to or greater than −2.90 bins and less than −1.46 bins, the radar device determines that the negative second aliasing has occurred, and if the bin difference falls within a range equal to or greater than −1.46 bins and less than −0.02 bins, the radar device determines that the negative first aliasing has occurred.

Figure 18A:
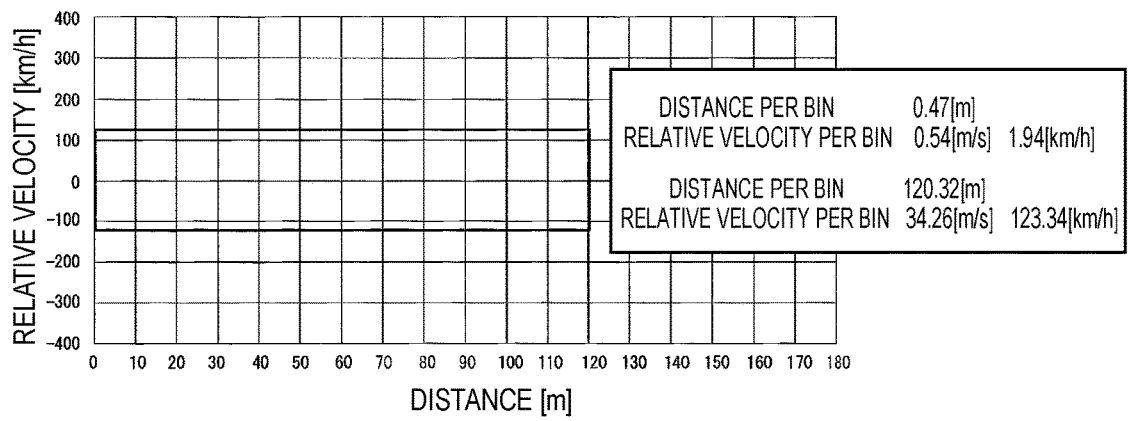
FIGS. 18A to 18C are explanatory views of detectable ranges.
Figure 18B:
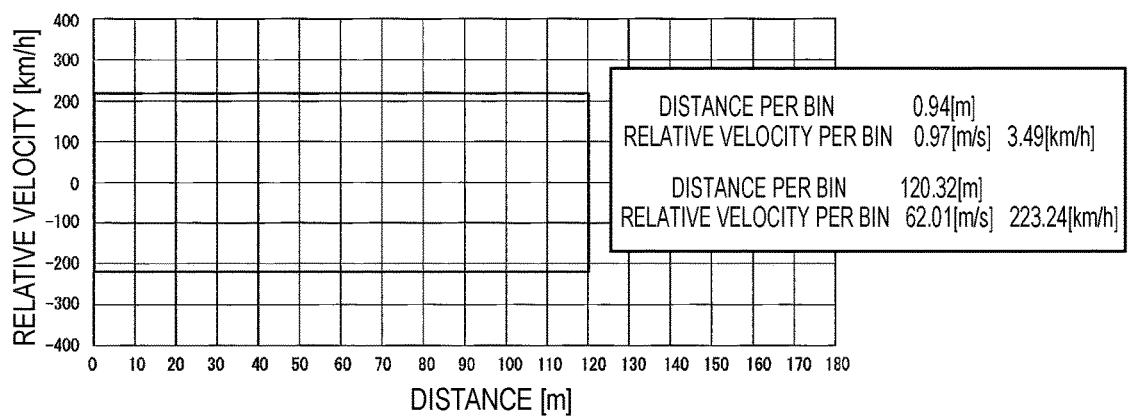
Figure 18C:
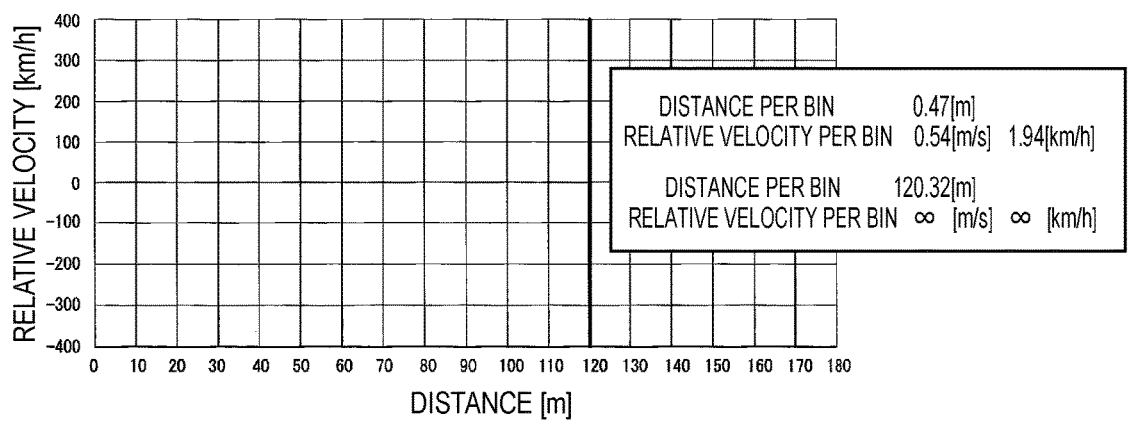

FIGS. 18A to 18C are explanatory views of detectable ranges. As shown in FIG. 18A, in a case where the maximum value of the relative velocity (the detection velocity range) is 34.26 m/s, and the relative velocity per bin (the velocity resolution) is 0.54 m/s, if the maximum value of the relative velocity is changed to 62.01 m/s while the sampling frequency is maintained, as shown in FIG. 18B, the relative velocity per bin, that is, the resolution decreases to 0.97 m/s.

According to the present embodiment, since the relative velocity is corrected on the basis of whether aliasing has occurred, even though aliasing occurs, it is possible to obtain an accurate value as a velocity measurement result. Therefore, regardless of requirements for hardware, such as the sampling frequency, it is possible to perform velocity measurement in a wide detection range as shown in FIG. 18C.

Although the preferred embodiments of the present invention have been described above, the radar device according to the present invention is not limited thereto, and can include every combination of the embodiments.

What is claimed is:

1. A radar device comprising:
   a transmitter configured to transmit a transmission signal in which an up period in which the frequency increases and a down period in which the frequency are repeated;
   a receiver configured to receive the reflected waves of the transmission signal from a target, as reception signals; and
   a processor configured to execute a program to:
   compute the distance between the target and the radar device based on a reception signal corresponding to the up period, as an up-side distance, and compute the distance between the target and the radar device based on a reception signal corresponding to the down period, as a down-side distance;
   determine whether velocity aliasing has occurred, on the basis of the up-side distance and the down-side distance; and
   compute the relative velocity between the target and the radar device, on the basis of the result of determination on velocity aliasing, and at least one of the reception signal corresponding to the up period and the reception signal corresponding to the down period.

2. The radar device according to claim 1,
wherein the processor obtains the number of times of aliasing on the basis of the difference between the up-side distance and the down-side distance, and
wherein the processor corrects a relative velocity obtained on the basis of at least one of the reception signal corresponding to the up period and the reception signal corresponding to the down period, on the basis of the number of times of aliasing, thereby computing the relative velocity of the target.

3. The radar device according to claim 1,
wherein the processor obtains the number of times of aliasing on the basis of the difference between the up-side distance and the down-side distance, and
wherein the processor obtains a plurality of velocity measurement results regardless of the possibility of aliasing, on the basis of at least one of the reception signal corresponding to the up period and the reception signal corresponding to the down period, and selects the relative velocity of the target from the plurality of velocity measurement results, on the basis of the number of times of aliasing.

4. A signal processing device for a radar device, comprising:
a receiver configured to receive the reflected waves of a transmission signal in which an up period in which the frequency increases and a down period in which the frequency are repeated, from a target, as reception signals, and compute the distance between the target and the radar device based on a reception signal corresponding to the up period, as an up-side distance, and compute the distance between the target and the radar device based on a reception signal corresponding to the down period, as a down-side distance; and
a processor configured to execute a computer program to:
determine whether velocity aliasing has occurred, on the basis of the up-side distance and the down-side distance; and
compute the relative velocity between the target and the radar device, on the basis of the result of determination on aliasing, and at least one of the reception signal corresponding to the up period and the reception signal corresponding to the down period.

5. A signal processing method for a radar device, comprising:
receiving the reflected waves of a transmission signal in which an up period in which the frequency increases and a down period in which the frequency are repeated, from a target, as reception signals, and computing the distance between the target and the radar device based on a reception signal corresponding to the up period, as an up-side distance, and computing the distance between the target and the radar device based on a reception signal corresponding to the down period, as a down-side distance;
determining whether velocity aliasing has occurred, on the basis of the up-side distance and the down-side distance; and
computing the relative velocity between the target and the radar device, on the basis of the result of determination on aliasing, and at least one of the reception signal corresponding to the up period and the reception signal corresponding to the down period.

* * * * *